US007862140B2

(12) United States Patent
Yoshida et al.

(10) Patent No.: US 7,862,140 B2
(45) Date of Patent: Jan. 4, 2011

(54) PRINTING METHOD, PRINTING APPARATUS, AND STORAGE MEDIUM HAVING PROGRAM STORED THEREON WITH INK EJECTION AMOUNT CORRECTION

(75) Inventors: Masahiko Yoshida, Shiojiri (JP); Bunji Ishimoto, Matsumoto (JP); Toru Miyamoto, Shiojiri (JP); Tatsuya Nakano, Hata-machi (JP); Hirokazu Nunokawa, Matsumoto (JP); Yoichi Kakehashi, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 11/844,061

(22) Filed: Aug. 23, 2007

(65) Prior Publication Data

US 2008/0074455 A1 Mar. 27, 2008

(30) Foreign Application Priority Data

Aug. 25, 2006 (JP) ............................ 2006-229454

(51) Int. Cl.
*B41J 29/393* (2006.01)
*B41J 29/38* (2006.01)
*G06K 15/00* (2006.01)

(52) U.S. Cl. ............................ 347/19; 347/14; 347/16; 358/3.06

(58) Field of Classification Search .................. 347/15, 347/41, 43, 19, 14, 16; 358/2.1, 3.01–3.19, 358/3.21–3.23
See application file for complete search history.

(56) References Cited

U.S. PATENT DOCUMENTS

| | | | | |
|---|---|---|---|---|
| 6,155,668 | A * | 12/2000 | Otsuki et al. | 347/41 |
| 6,302,520 | B1 * | 10/2001 | Akiyama et al. | 347/43 |
| 6,533,393 | B1 * | 3/2003 | Meyer et al. | 347/43 |
| 6,744,530 | B1 | 6/2004 | Someno et al. | |
| 6,948,796 | B2 * | 9/2005 | Otsuki | 347/41 |
| 7,093,917 | B2 | 8/2006 | Yamada | |
| 7,556,335 | B2 * | 7/2009 | Yamasaki et al. | 347/19 |
| 2005/0007405 | A1 * | 1/2005 | Shepherd et al. | 347/15 |
| 2006/0033770 | A1 | 2/2006 | Yamasaki et al. | |
| 2006/0227159 | A1 * | 10/2006 | Nakajo | 347/15 |
| 2007/0057985 | A1 | 3/2007 | Saito et al. | |
| 2007/0076033 | A1 * | 4/2007 | Nakajo | 347/15 |
| 2007/0121130 | A1 | 5/2007 | Yoshida | |

FOREIGN PATENT DOCUMENTS

| | | | |
|---|---|---|---|
| JP | 2-054676 | | 2/1990 |
| JP | 2004-122362 | A | 4/2004 |
| JP | 2005-022404 | A | 1/2005 |
| JP | 2006-035652 | A | 2/2006 |
| JP | 2006-116975 | A | 5/2006 |
| JP | 2006-218838 | A | 8/2006 |
| WO | 2005/042256 | A1 | 5/2005 |

* cited by examiner

*Primary Examiner*—Stephen D Meier
*Assistant Examiner*—Rene Garcia, Jr.
(74) *Attorney, Agent, or Firm*—Sughrue Mion, PLLC

(57) ABSTRACT

A method including performing correction of an ink ejection amount for a certain area based on a correction value for a first type row region, and performing correction of an ink ejection amount for another area. The certain area includes a plurality of the first type row regions adjacent to each other in a transport direction. The other area is located on the upstream side in the transport direction from the certain area, and includes a plurality of second type row regions and a plurality of the first type row regions in the transport direction. The second type row region is a region in which a dot row is formed in the movement direction by performing the movement-and-ejection operation another predetermined number of times that is more than the predetermined number of times. A ratio of the second type row regions increases as the distance from the certain area increases.

11 Claims, 18 Drawing Sheets

212

DATA TABLE OF READ DENSITIES

| ROW REGION NUMBER | YELLOW | | | CYAN | | | LIGHT MAGENTA | | | |
|---|---|---|---|---|---|---|---|---|---|---|
| | DENSITY 1 | DENSITY 2 | DENSITY 3 | DENSITY 1 | DENSITY 2 | DENSITY 3 | DENSITY 1 | DENSITY 2 | DENSITY 3 | DENSITY 1 |
| 1 | XXX | XXX | XXX | XXX | XXX | XXX | XXX | XXX | XXX | XXX |
| 2 | XXX | XXX | XXX | XXX | XXX | XXX | XXX | XXX | XXX | XXX |
| 3 | XXX | XXX | XXX | XXX | XXX | XXX | XXX | XXX | XXX | XXX |

...

⋮

PRINTING METHOD, PRINTING APPARATUS, AND STORAGE MEDIUM HAVING PROGRAM STORED THEREON WITH INK EJECTION AMOUNT CORRECTION

CROSS-REFERENCE TO RELATED APPLICATIONS

This application claims priority upon Japanese Patent Application No. 2006-229454 filed on Aug. 25, 2006, which is herein incorporated by reference.

BACKGROUND

1. Technical Field

The present invention relates to printing methods, printing apparatuses, and storage media having a program stored thereon.

2. Related Art

In printing apparatuses such as inkjet printers, the density of a test pattern that is printed by such a printing apparatus is measured to obtain measured values, and ink ejection conditions thereof are adjusted based on the obtained measured values (for example, see JP-A-2-54676).

In this type of printing apparatus, there are cases in which printing can be performed more appropriately by switching printing modes depending on the printing position on a medium. For example, in a printing apparatus in which rollers for transporting media are provided both on the upstream and downstream sides in a transport direction with respect to a print head, there are cases in which printing can be performed more appropriately by increasing, when an upstream end portion of the medium ceases to be held by the upstream side rollers, the number of passes required to form a single line than before the medium ceases to be held by the upstream side rollers.

In such a printing apparatus, correspondence relations between nozzles and correction values may be changed due to increase in the number of passes. Consequently, image quality may rather deteriorate as a result of the correction values being applied.

SUMMARY

The invention has been achieved to address the above-described circumstances, and has a main advantage of preventing deterioration of image quality when the number of required passes is changed.

A primary aspect of the invention is:

a printing method including:

(A) performing correction of an ink ejection amount for a certain area based on a correction value for a first type row region, the certain area including a plurality of the first type row regions adjacent to each other in a transport direction of a medium, the first type row region being a region in which a dot row is formed in a movement direction that intersects the transport direction by performing a predetermined number of times a movement-and-ejection operation in which ink is ejected from a nozzle while the nozzle is moved in the movement direction; and (B) performing correction of an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

Other features of the present invention will become clear by the accompanying drawings and the description hereinbelow.

BRIEF DESCRIPTION OF THE DRAWINGS

For a more complete understanding of the invention and the advantages thereof, reference is now made to the following description taken in conjunction with the accompanying drawings wherein.

DESCRIPTION OF EXEMPLARY EMBODIMENTS

Figure 1:
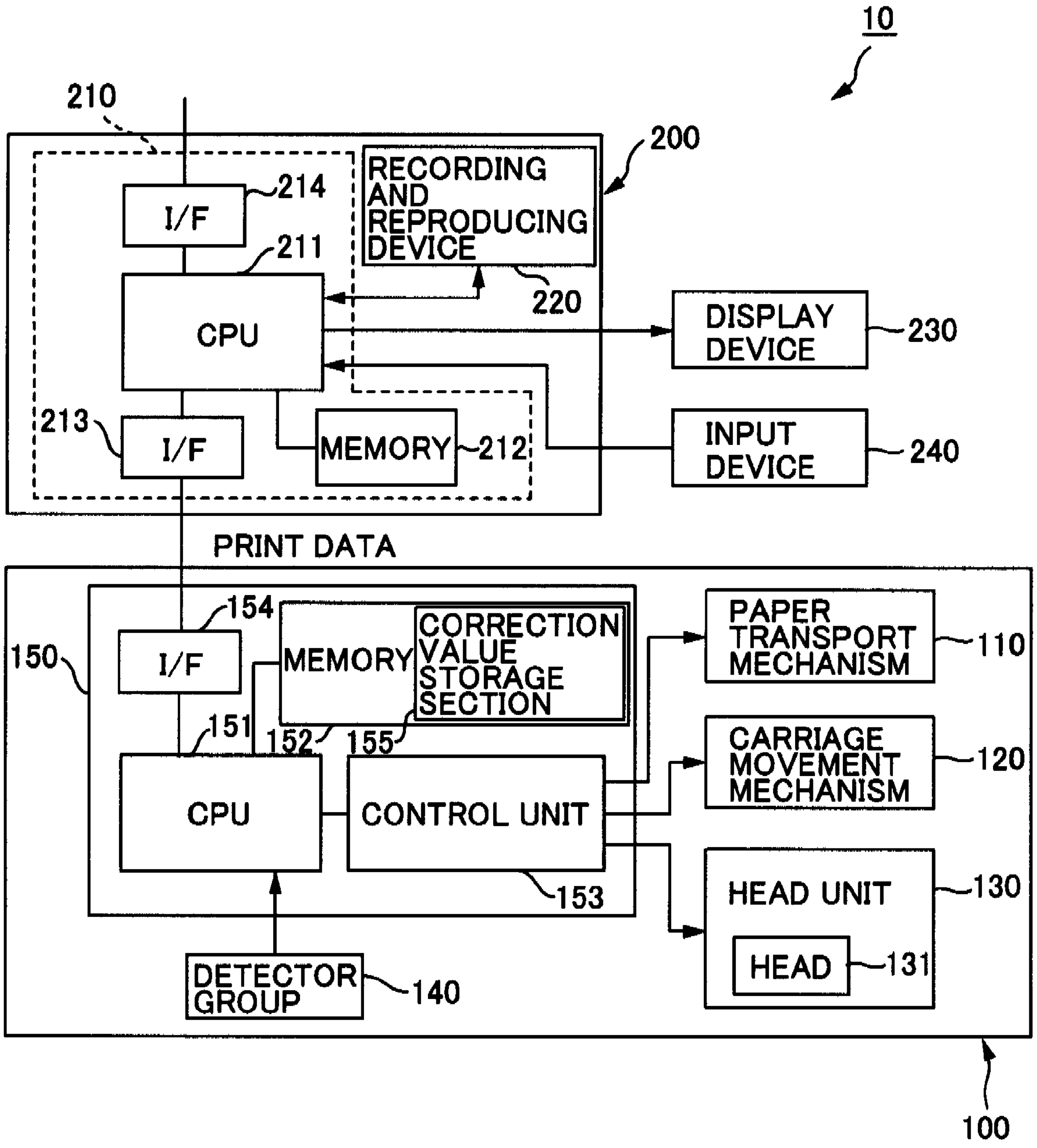
FIG. 1 is a block diagram illustrating a configuration of a printing system.

At least the following matters will be made clear by the description of the present specification and the accompanying drawings.

It is made clear that the following printing method can be achieved.

A printing method including:

(A) performing correction of an ink ejection amount for a certain area based on a correction value for a first type row region, the certain area including a plurality of the first type row regions adjacent to each other in a transport direction of a medium, the first type row region being a region in which a dot row is formed in a movement direction that intersects the transport direction by performing a predetermined number of times a movement-and-ejection operation in which ink is ejected from a nozzle while the nozzle is moved in the movement direction; and (B) performing correction of an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

With such a printing method, a degree of correction based on the correction value for the first type row region is reduced in the other area as the distance from the certain area increases. Therefore, appropriate correction can be performed on the side close to the certain area, and adverse effects due to the correction can be prevented on the side distant from the certain area. As a result, even when the number of passes required to form a certain dot row is changed, image quality deterioration caused thereby can be prevented.

In such a printing method, it is preferable the other correction value is generated based on the correction value for the first type row region and an attenuation coefficient to reduce a degree of the correction.

With such a printing method, the other correction value can be easily generated based on the attenuation coefficient.

In such a printing method, it is preferable that the dot row is formed in the first type row region by performing the movement- and ejection-operation once, and the dot row is formed in the second type row region by performing the movement-and-ejection operation twice.

With such a printing method, since the movement-and-ejection operation is performed a minimum number of times for a single row region, printing speed can be increased. In addition, since the ink ejection amount is corrected based on the correction value, the image quality can be improved.

In such a printing method, it is preferable that the nozzles are lined up in the transport direction and form a nozzle row.

With such a printing method, deterioration of the image quality caused by variance in the characteristics of the respective nozzles can be prevented.

In such a printing method, it is preferable that a plurality of the nozzle rows are provided in different positions in the movement direction.

With such a printing method, many types of ink can be ejected.

In such a printing method, it is preferable that the nozzle rows respectively eject different colors of ink.

With such printing method, multi-color printing of high image quality is possible.

In such a printing method, it is preferable that the correction value for the first type row region is set for plural types so as to correspond to combinations of the row region and the nozzle used to form a dot row in the row region.

With such a printing method, it is possible to efficiently correct the ejection amount with a small number of types of correction values.

It is also made clear that the following printing apparatus can be achieved.

A printing apparatus, including:

(A) a nozzle movement mechanism that moves a nozzle that ejects ink in a movement direction;

(B) a transport mechanism that transports a medium in a transport direction that intersects the movement direction; and (C) a controller that controls a movement-and-ejection operation for ejecting ink while moving the nozzle and a transport operation for transporting the medium in the transport direction, corrects an ink ejection amount for a certain area based on a correction value for a first type row region, the certain area including a plurality of the first type row regions adjacent to each other in the transport direction, the first type row region being a region in which a dot row is formed in the movement direction by performing a predetermined number of times the movement-and-ejection operation, and corrects an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

In such a printing apparatus, it is preferable that a memory in which the correction value for the first type row region and the other correction value are stored, is further included.

With such a printing apparatus, since the printing apparatus includes a memory in which the correction value for the first type row region and the other correction value are stored, the controller is only required to read out the correction value. Therefore, the processes can be simplified and performed in a shorter time.

In such a printing apparatus, it is preferable that the transport mechanism includes a transport roller that transports the medium, the transport roller being disposed on the upstream side in the transport direction from a plurality of nozzles, and transporting the medium until printing for the other area is finished.

With such a printing apparatus, when a medium ceases to be held by the transport roller, printing for the other area is finished and printing for the second type row region has started. Therefore, deterioration of the image quality can be prevented in a state in which the medium is not held by the transport roller.

It is also made clear that a storage medium having the following computer program stored thereon can be achieved.

A storage medium having a program stored thereon, the program including:

(A) code that causes a controller to control a movement-and ejection-operation and a transport operation, the movement-and-ejection operation being for ejecting ink while moving a nozzle in a movement direction, the transport operation being for transporting a medium in a transport direction that intersects the movement direction;

(B) code that causes the controller to correct an ink ejection amount for a certain area based on a correction value for a first type row region, the certain area including a plurality of the first type row regions adjacent to each other in the transport direction, the first type row region being a region in which a dot row is formed in the movement direction by performing a predetermined number of times the movement-and-ejection operation; and (C) code that causes the controller to correct an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

Printing System 10

A printing system 10 is described prior to the description of a correction value setting system. The printing system 10 is for printing images on paper, and includes an inkjet printer 100 (hereinafter, also simply referred to as the "printer 100") and a host computer 200, as shown in FIG. 1. Here, a printing apparatus is described. The controller of the printing apparatus also performs control in accordance with a printer driver 216 (see FIG. 5), as described later. Therefore, when the host computer 200 executes the printer driver 216, the printer 100 and the host computer 200 as a pair correspond to the printing apparatus. Also, when a printer-side controller 150 can perform functions equivalent to those of the printer driver 216, that is, when the printer 100 can perform printing on the paper S by itself, the printer 100 corresponds to the printing apparatus.

Printer 100

The printer 100 includes a paper transport mechanism 110, a carriage movement mechanism 120, a head unit 130, a detector group 140, and the printer-side controller 150.

Figure 2:
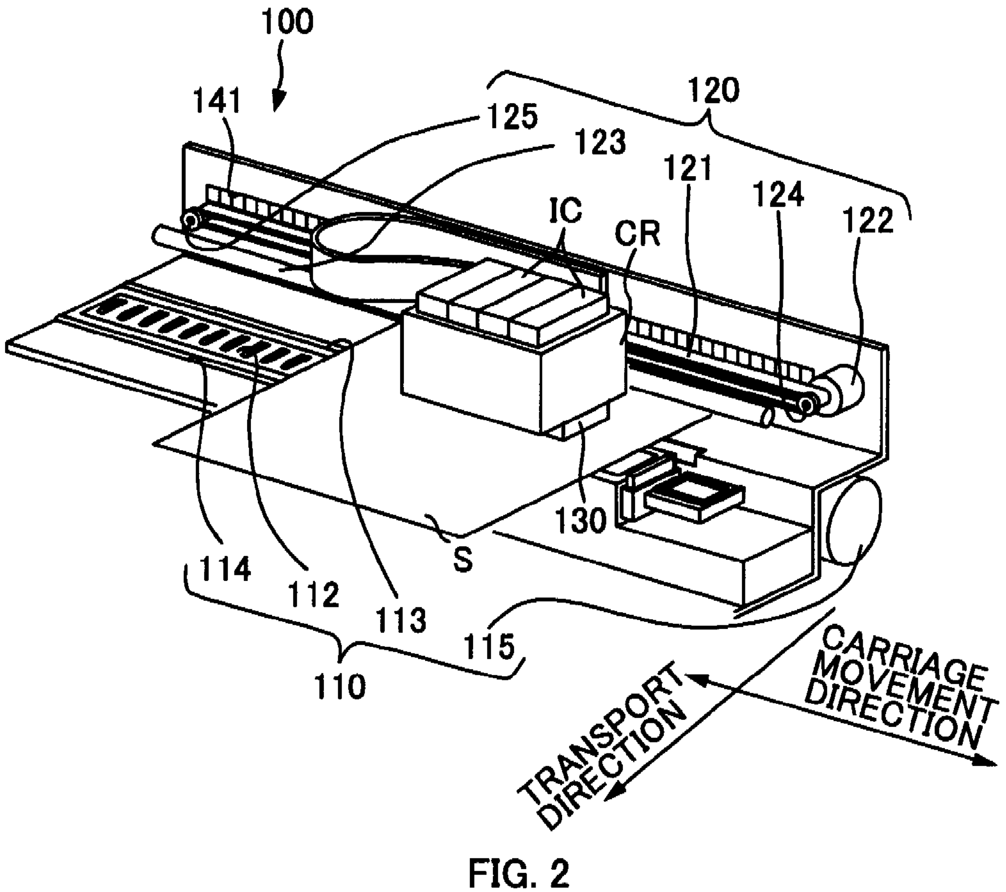
FIG. 2 is a perspective view illustrating a structure of a printer.
Figure 3:
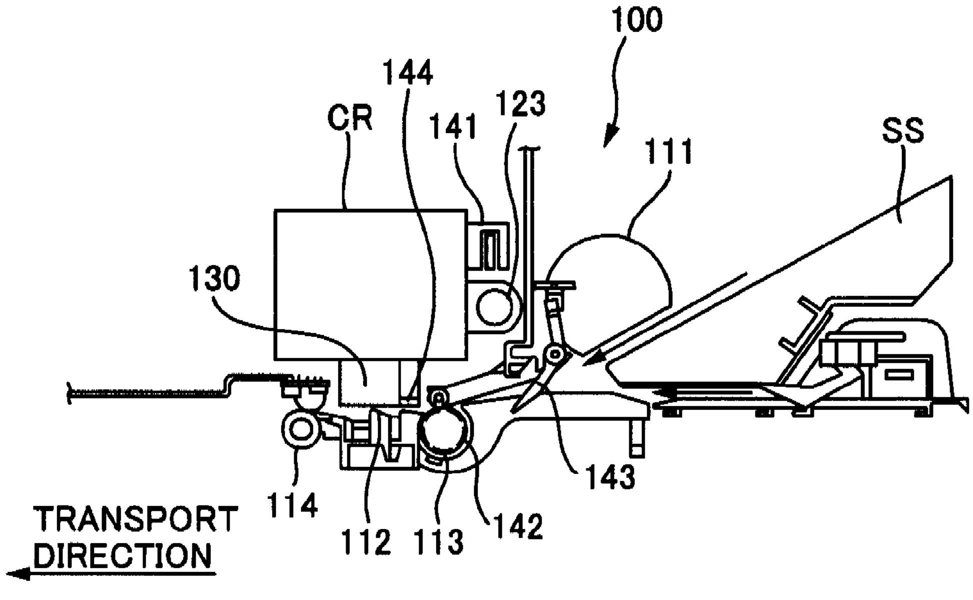
FIG. 3 is a side view illustrating the structure of the printer.

The paper transport mechanism 110 corresponds to a transport mechanism that transports a media in a transport direction. Here, the transport direction is a direction that intersects a carriage movement direction described next. As shown in FIGS. 2 and 3, the paper transport mechanism 110 includes a paper feed roller 111 disposed in a predetermined position higher than a paper stocker SS, a platen 112 that supports the paper S at the back face thereof, transport rollers 113 disposed on the upstream side in the transport direction from the platen 112, discharge rollers 114 disposed on the downstream side in the transport direction from the platen 112, and a transport motor 115 that serves as a driving source of the transport rollers 113 and the discharge rollers 114. The transport rollers 113 include an upper roller and a lower roller, which sandwich the paper S to transport the same. In a similar manner, the discharge rollers 114 also include an upper roller and a lower roller, which sandwich the paper S to transport the same. Above the platen 112, the head unit 130 that includes nozzles Nz (see FIG. 4) is arranged. Therefore, the transport rollers 113 and the discharge rollers 114 are disposed on the upstream side and the downstream side in the transport direction from the nozzles Nz, respectively. In this paper transport mechanism 110, the paper feed roller 111 forwards the paper S held in the stocker one sheet at a time. Then, the transport rollers 113 forward the paper S toward the platen 112, and the discharge rollers 114 forward the paper S on which printing has been performed in the transport direction.

Now, in a state in which a front end (a downstream end) of the paper S is positioned on the upstream side in the transport direction from the discharge rollers 114, the paper S is transported by the transport rollers 113, and not by the discharge rollers 114. In contrast, in a state in which a rear end (an upstream end) of the paper S is not held by the transport rollers 113, the paper S is transported by the discharge rollers 114, and not by the transport rollers 113. Specifically, the paper S is transported by either of the transport rollers 113 and the discharge rollers 114. Also, in a state other than those described above, the paper S is transported in a stable manner while being sandwiched by both of the transport rollers 113 and the discharge rollers 114. Transport by either of the transport rollers 113 and the discharge rollers 114 can be considered less stable than transport by both of the transport rollers 113 and the discharge rollers 114.

The carriage movement mechanism 120 is for moving a carriage CR in the carriage movement direction. The carriage CR is a component to which ink cartridges IC and the head unit 130 are attached. The carriage movement direction includes a movement direction from one side to the other side, and a movement direction from the other side to that one side. The head unit 130 includes nozzles Nz. Therefore, the carriage movement mechanism 120 corresponds to a nozzle movement mechanism, and the carriage movement direction corresponds to a movement direction of the nozzles. The carriage movement mechanism 120 includes a timing belt 121, a carriage motor 122, a guide shaft 123, a drive pulley 124, and an idler pulley 125. The timing belt 121 is connected to the carriage CR, and is stretched around the drive pulley 124 and the idler pulley 125. The carriage motor 122 is a driving source for rotating the drive pulley 124. The guide shaft 123 is a component for guiding the carriage CR in the carriage movement direction. In the carriage movement mechanism 120, it is possible to move the carriage CR in the carriage movement direction by operating the carriage motor 122.

Figure 4:
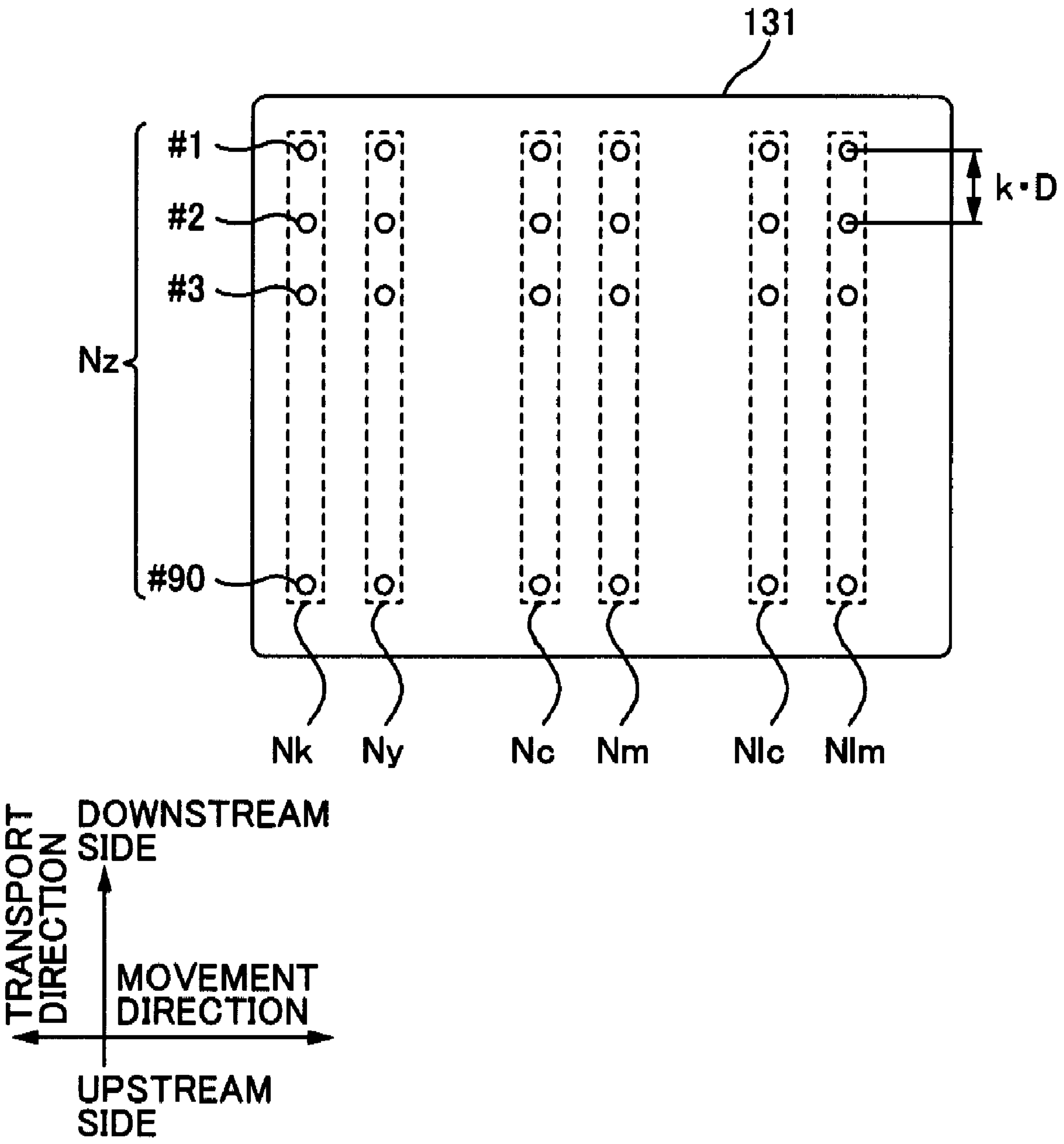
FIG. 4 is a diagram illustrating nozzle rows of a head.

The head unit 130 has a head 131 for ejecting ink toward the paper S. The head 131 opposes the platen 112 when attached to the carriage CR. As shown in FIG. 4, a plurality of nozzles Nz that eject ink are provided in a face of the head 131 (a nozzle face) that opposes the platen 112. These nozzles Nz are divided into groups according to types of ink ejected, with each group constituting a nozzle row. That is, the nozzle row corresponds to a nozzle group made up of a plurality of nozzles Nz that eject the same type of ink. The illustrated head 131 includes a black ink nozzle row Nk, a yellow ink nozzle row Ny, a cyan ink nozzle row Nc, a magenta ink nozzle row Nm, a light cyan ink nozzle row Nlc, and a light magenta ink nozzle row Nlm. These nozzle rows Nk to Nlm are disposed with their positions shifted to each other in the carriage movement direction when the head 131 is attached to the carriage CR.

Each nozzle row has n (n=90, for example) nozzles Nz. A plurality of nozzles Nz that belong to the same nozzle row are provided at a constant spacing (a nozzle pitch K•D) in the transport direction. Here, D is a minimum dot pitch in the transport direction, that is, a spacing of dots formed on the paper S at the highest resolution. Moreover, k is a coefficient indicating a relationship between the minimum dot pitch D and the nozzle pitch, and is set to an integer of 1 or more. For example, if the nozzle pitch is 180 dpi (a spacing of 1/180 inch) and the dot pitch in the transport direction is 720 dpi (1/720 inch), then k=4. In addition, each nozzle Nz can eject ink (ink droplets) of different amounts.

In this manner, a plurality of the nozzles Nz are lined up in the transport direction to constitute a nozzle row, and a plurality of the nozzle rows are provided in different positions in the movement direction, with each of the nozzle rows ejecting different color of ink. In this manner, it is possible to eject many types (colors) of ink even with a limited area of the nozzle arrangement face.

The detector group 140 is for monitoring the conditions inside the printer 100. As shown in FIGS. 2 and 3, the detector group 140 includes a linear encoder 141, a rotary encoder 142, a paper detector 143, and a paper width detector 144.

The printer-side controller 150 is for controlling the printer 100, and includes a CPU 151, a memory 152, a control unit 153, and an interface section 154. The CPU 151 is a processing unit for controlling the entire printer 100. The memory 152 is for reserving a region for storing programs for the CPU 151 and a working area, for instance, and is constituted by storage elements such as a RAM, an EEPROM, or a ROM. The CPU 151 controls various control target sections via the control unit 153 in accordance with computer programs stored in the memory 152. Accordingly, the control unit 153 outputs various signals based on instructions from the CPU 151. The printer-side controller 150, along with the host-side controller 210, corresponds to a controller that controls a movement-and-ejection operation, in which ink is ejected while the nozzles Nz is moved in the carriage movement direction, and a transport operation, in which the paper S is transported in the transport direction. At this time, the printer-side controller 150 is in charge of direct controls over each section of the printer 100, while the host-side controller 210 is in charge of image density correction (correction of ink ejection amount) based on correction values. In addition, a partial region of the memory 152 is used as a correction value storage section 155. Correction values (described later) used for correcting the density of a to-be-printed image on a row region basis are stored in the correction value storage section 155.

Host Computer 200

The host computer 200 includes the host-side controller 210, a recording and reproducing device 220, a display device 230, and an input device 240. Among these, the host-side controller 210 has a CPU 211, a memory 212, a first interface section 213, and a second interface section 214. The CPU 211 is a processing unit for performing the overall control of the computer. The memory 212 is for reserving an area for storing computer programs used by the CPU 211 and a working area, for instance. The CPU 211 performs various controls according to the computer programs stored in the memory 212. The first interface section 213 exchanges data with the printer 100, and the second interface section 214 exchanges data with external devices other than the printer 100 (a scanner, for example).

Figure 5:
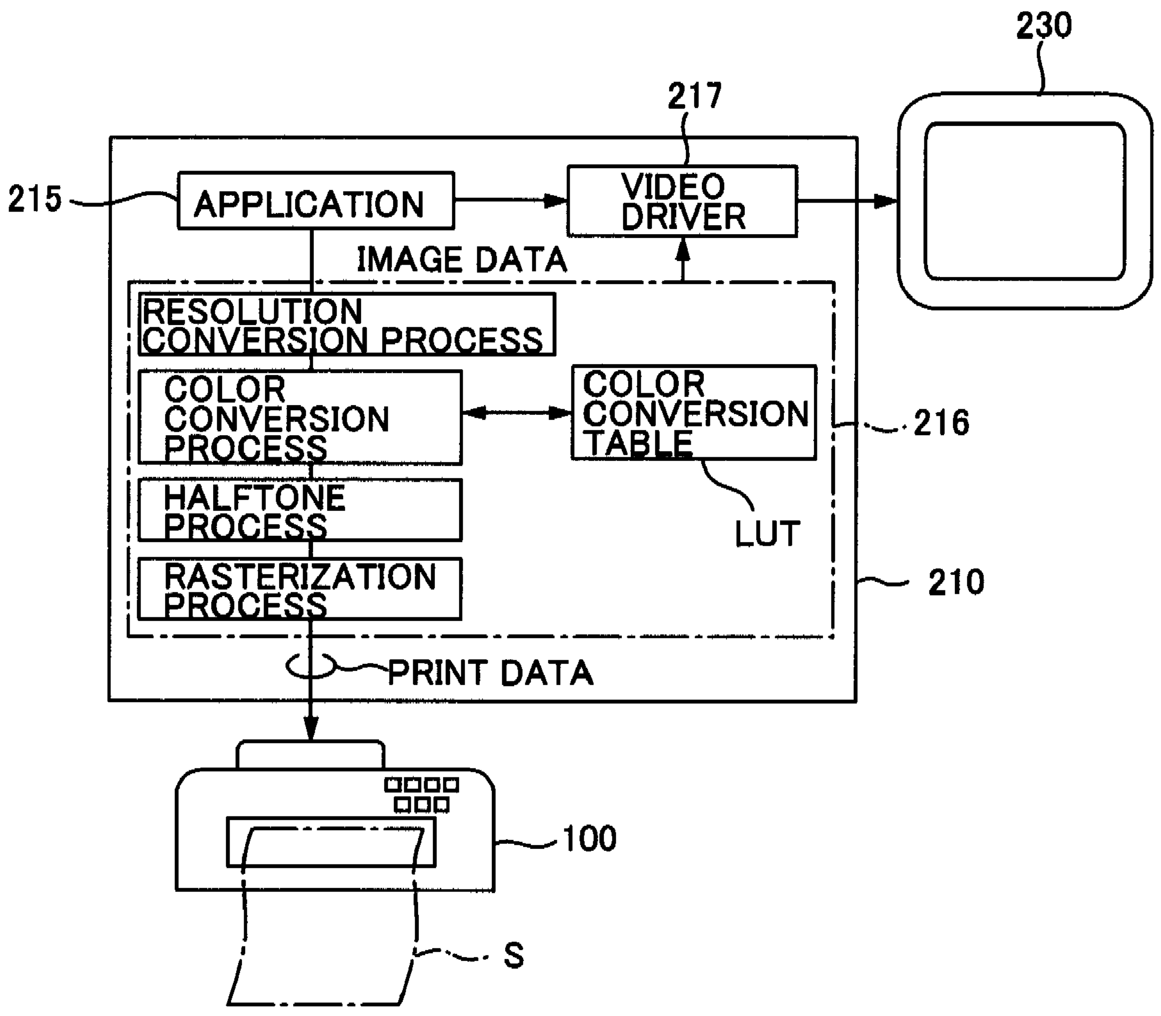
FIG. 5 is a conceptual diagram illustrating a computer program stored in a memory of a host computer.

Examples of computer programs stored in the memory 212 of the host-side controller 210 include an application program 215, a printer driver 216 and a video driver 217, as shown in FIG. 5. The application program 215 causes the host computer 200 to perform a desired operation. The printer driver 216 is for controlling the printer 100, and for example, generates print data based on image data from the application program 215 and transmits the generated data to the printer 100. The video driver 217 is for displaying display data from the application program 215 and the printer driver 216 on the display device 230.

Here, print data transmitted from the printer driver 216 is described. This print data is data in a format that can be interpreted by the printer 100, and has various types of command data and dot forming data. The command data is data for instructing the printer 100 to carry out a particular operation. The command data includes, for example, paper feed data for instructing paper feed, transport amount data that indicates a transport amount, and discharge data for instructing paper discharge. The dot forming data is data relating to a dot to be formed on the paper S (data for color and size of the dot, for example). This dot forming data is constituted by a plurality of dot tone values determined for each unit region. The unit region refers to a rectangular region that is virtually defined on a medium such as the paper S, and its size and shape are determined depending on the print resolution. For example, if the print resolution is 720 dpi (the carriage movement direction)×720 dpi (the transport direction), the unit region is a square region of approximately 35.28 μm×35.28 μm (≈1/720 inch×1/720 inch). The dot tone value indicates the size of a dot formed in the unit region. In this printing system 10, the dot tone value is constituted by two-bit data. Therefore, it is possible to control formation of a dot in four tone levels in a single unit region.

Printing Operation

Operation on the Side of Host Computer 200

Printing operation is performed by, for example, execution of a print command in the application program 215 by a user. When the print command in the application program 215 is executed, the host-side controller 210 generates to-be-printed image data. The image data is converted into print data by the host-side controller 210 that executes the printer driver 216. The conversion into print data is carried out through a resolution conversion process, a color conversion process, a halftone process, and a rasterization process. Therefore, the printer driver 216 includes program code for performing these processes.

The resolution conversion process is a process for converting the resolution of image data into the print resolution. The print resolution is the resolution used for performing printing on the paper S. The color conversion process is a process for converting RGB pixel data of RGB image data into CMYK pixel data in multiple tone values (for example, 256 levels) expressed in CMYK color space. This color conversion process is performed by referencing a table (color conversion lookup table LUT) in which RGB tone values are associated with CMYK tone values. This printer 100 performs printing with six colors of ink, namely, cyan (C), light cyan (LC), magenta (M), light magenta (LM), yellow (Y), and black (K). Therefore, in the color conversion process, data is generated for each of these colors. It should be noted that the correction values stored in the correction value storage section 155 are used in the color conversion process (described later).

Figure 6:
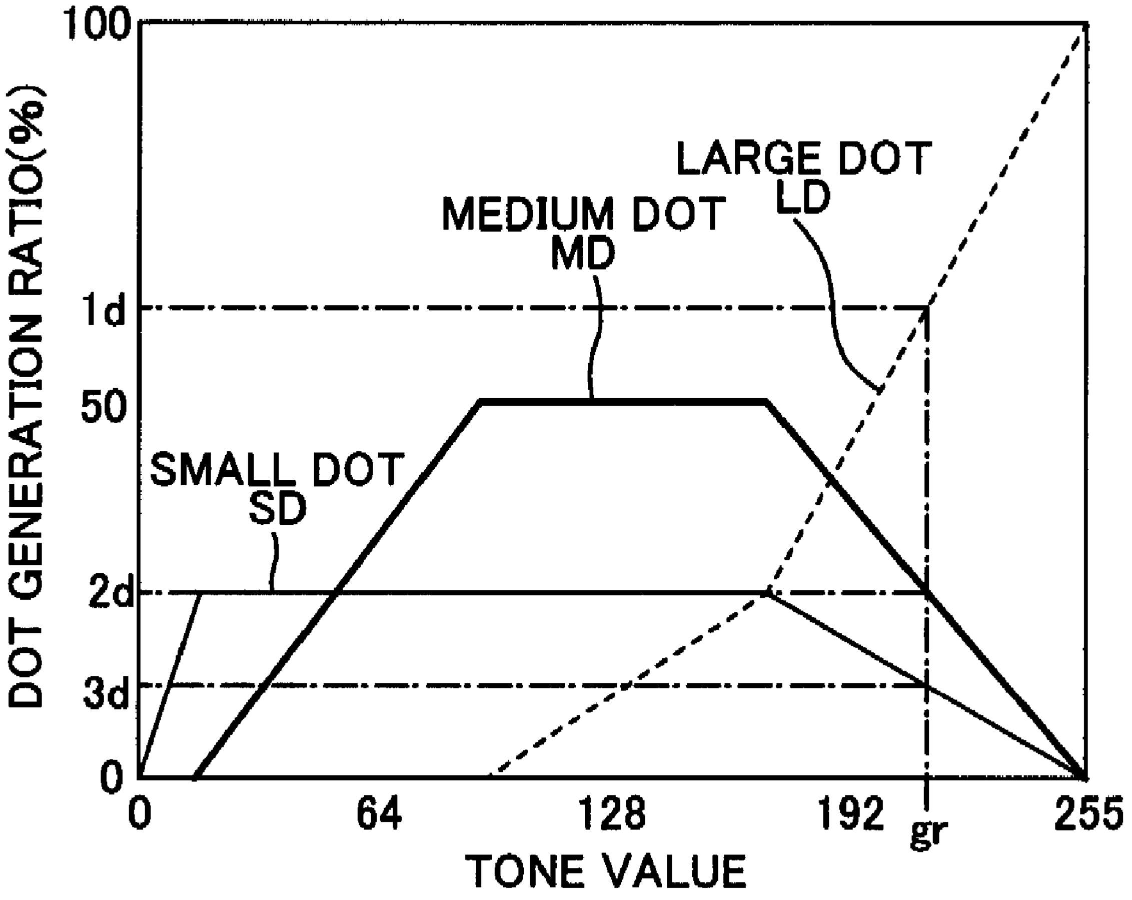
FIG. 6 is a diagram schematically illustrating a halftone process.

The halftone process is a process for converting CMYK pixel data in multiple tone values into dot tone values in a few tone values that can be expressed by the printer 100. Specifically, one of the following four tone values is set for each unit region; “no dot formation”, “small dot formation”, “medium dot formation” and “large dot formation”. The generation ratio of each of these dots is determined in accordance with the tone value. For example, as shown in FIG. 6, in the unit region for which a tone value gr is specified, the formation ratio of these dots is 1d for a large dot, 2d for a medium dot, and 3d for a small dot. In the halftone process, methods such as dithering, gamma correction, and error diffusion are used. The rasterization process is a process for rearranging the dot tone values obtained by the halftone process in the order for transfer to the printer 100. In this manner, the dot forming data is generated for each color. This dot forming data constitutes the print data together with the above-described command data, and is transmitted to the printer 100.

Operation on the Side of Printer 100

On the side of the printer 100, the printer-side controller 150 performs various processes based on the received print data. It should be noted that the various processes on the side of the printer 100 described below are performed by the printer-side controller 150 executing the computer programs stored in the memory 152. Therefore, the computer programs contain program code to carry out the processes.

Figure 7:
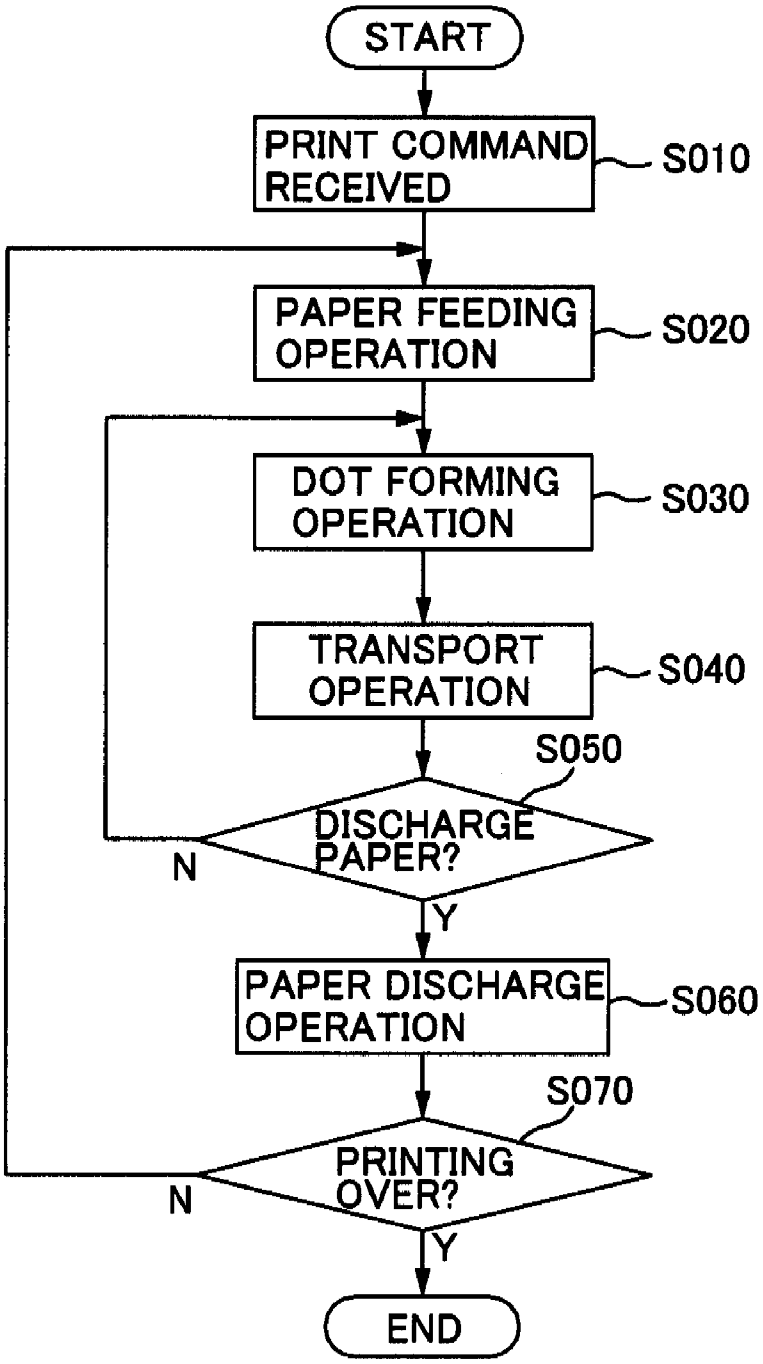
FIG. 7 is a flowchart illustrating a printing operation on the printer side.

The printer-side controller 150, as shown in FIG. 7, upon receiving a print command in print data (S010), carries out a paper feeding operation (S020), a dot forming operation (S030), a transport operation (S040), a paper discharge determination (S050), a paper discharge operation (S060), and a print over determination (S070). The paper feeding operation is an operation for moving and positioning a to-be-printed paper S at a print start position (also referred to as the “indexing position”). In this paper feeding operation, the printer-side controller 150 drives the transport motor 115 to rotate the paper feed roller 111 and the transport rollers 113. The dot forming operation is an operation for forming dots on the paper S. In this dot forming operation, the printer-side controller 150 drives the carriage motor 122, or outputs control signals to the head 131. As a result, each of the nozzles Nz moves with the carriage CR and intermittently ejects ink. Such a dot forming operation corresponds to a movement-and-ejection operation, in which ink is ejected while a plurality of the nozzles Nz are moved. The transport operation is an operation for moving the paper S in the transport direction. In this transport operation, the printer-side controller 150 drives the transport motor 115 to rotate the transport rollers 113 and the discharge rollers 114. By this transport operation, it is possible to form dots at positions that are different from positions of dots formed in the previous dot forming operation. The paper discharge determination is an operation to determine whether or not to discharge the paper S that is being printed. The paper discharge operation is a process to discharge the paper S, which is carried out on the condition that the determination made in the preceding paper discharge determination is “should be discharged”. In this paper discharge operation, the printer-side controller 150 drives the transport motor 115 to rotate the transport rollers 113 and the discharge rollers 114. The print over determination is a determination of whether or not to continue printing.

Here, an image is printed on the paper S by repeating the dot forming operation (S030) and the transport operation (S040) in alternation. When ink ejected from the nozzles Nz lands on the paper S, a dot is formed on the paper S. As a result, a dot row made up of a plurality of dots lined up in the carriage movement direction (hereinafter also referred to as a “raster line”) is formed on a surface of the paper S. Since the dot forming operation and the transport operation are repeated in alternation, a plurality of raster lines are formed aligned in the transport direction. Consequently, it can be said that the image printed on the paper S is constituted by a plurality of raster lines adjacent to one another in the transport direction.

Interlace Printing

Figure 8:
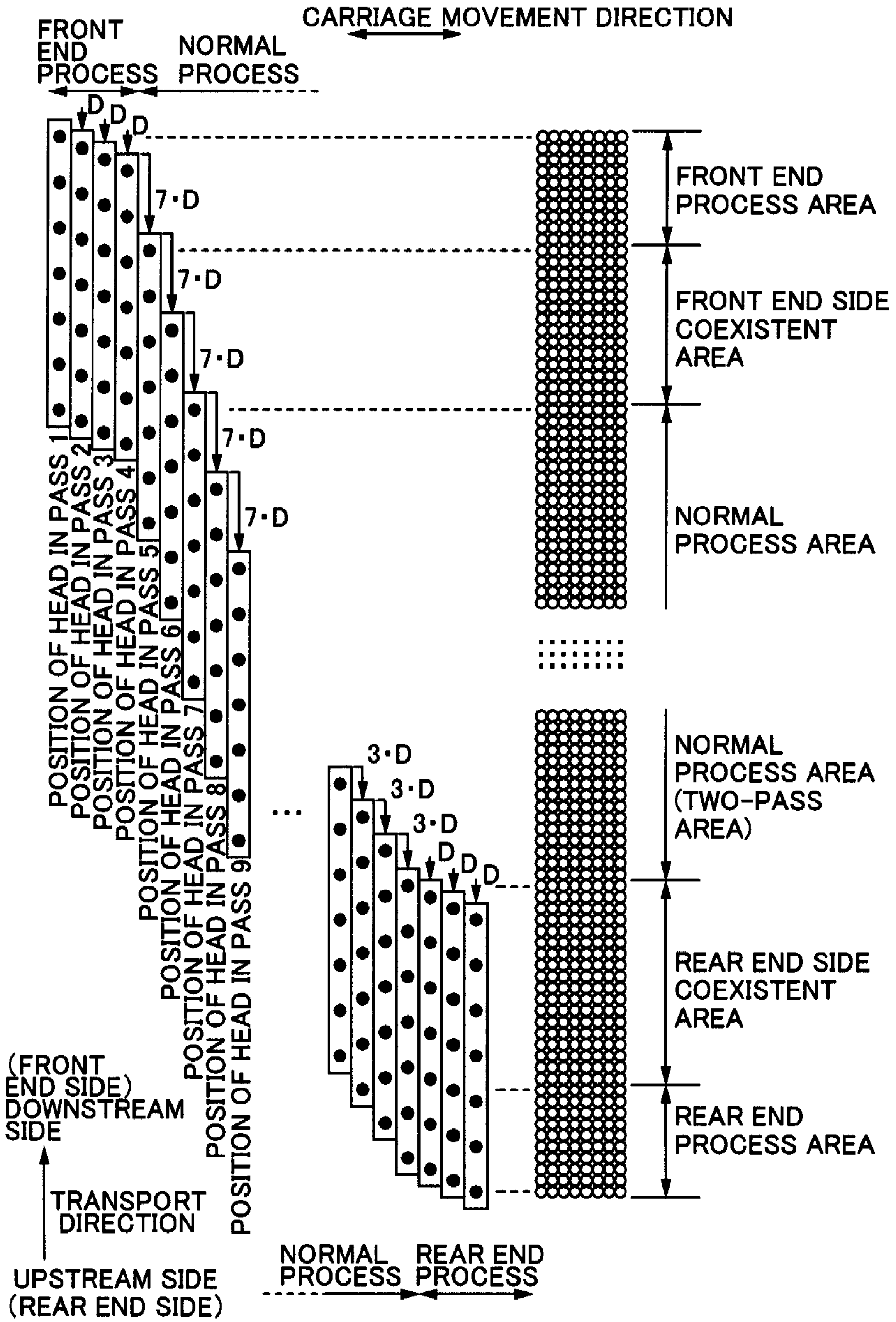
FIG. 8 is a diagram illustrating an example of interlace printing.

In this printer 100, images are printed by ejecting ink while the nozzles Nz are being moved. Incidentally, sections such as the nozzles Nz suffer certain variance caused during processing or assembly. Due to this variance, the characteristics such as flying trajectory or ejection amount of ink (hereinafter also referred to as “ejection characteristics”) also vary. In order to mitigate the variance in the ejection characteristics, printing by the interlace mode (hereinafter also referred to as “interlace printing”) is performed. The “interlace printing” refers to a printing scheme in which raster lines that are not recorded are sandwiched between raster lines that are recorded in a single pass. Also a “pass” refers to a single dot forming operation, that is, a single movement-and-ejection operation. In the example of interlace printing illustrated in FIG. 8, for the purpose of description, a single nozzle row including seven nozzles Nz is depicted. Also, although the nozzle row is illustrated as if moving with respect to the paper S, FIG. 8 shows the relative positions of the nozzle row and the paper S. Specifically, the paper S is moved in the transport direction in the actual printer 100.

In this interlace printing, a front end process, a normal process, and a rear end process are performed. The front end process is a printing method suitable for a front end portion (a downstream end portion in the transport direction) of the paper S, in which the paper S is printed by being transported by a smaller than that in the normal process. In this example, the transport amount is set to 1•D, and four-pass dot forming operation is performed. A single raster line is formed in one pass. For this reason, first to fourth raster lines from the front end side (a downstream end side) are formed with ink ejected from a first nozzle Nz (#1), and fifth to eighth raster lines are formed with ink ejected from a second nozzle Nz (#2). The normal process is a printing method suitable for a middle portion excluding the front end portion and rear end portion (an upstream end portion) of the paper S. In the normal process of this example, one-pass printing in which a single raster line is formed in one pass, and two-pass printing in which a single raster line is formed in two passes are performed. The one-pass printing is performed following the front end process, and two-pass printing is performed at the last of the normal process, that is, immediately prior to switching to the rear end process. The two-pass process is performed to prevent deterioration of image quality before and after the rear end of the paper S has ceased to be held by the transport rollers 113. In other words, when the rear end of the paper S ceases to be held by the transport rollers 113, the transport state becomes unstable since the paper S is transported by the discharge rollers 114 only. For this reason, variance in the ejection characteristics among the nozzles Nz is mitigated by performing the two-pass printing, and inconsistent transport is suppressed by reducing the transport amount. Thus the transport amount is set to 7•D in the one-pass printing, and 3•D in the two-pass printing. The rear end process is a printing method suitable for a rear end portion of the paper S (an upstream end portion in the transport direction), in which the paper S is printed by being transported by a smaller transport amount than that in the normal process. In this example, the transport amount is set to 1•D, and the four-pass dot forming operation is performed.

In this interlace printing, raster lines formed by the front end process and raster lines formed by the normal process coexist in an area in which the front end process is switched to the normal process. Also, in an area in which the normal process (the two-pass printing) is switched to the rear end process, dots formed by the normal process and dots formed by the rear end process coexist in a single raster line. For the sake of convenience, the former area is also referred to as a "front end side coexistent area" and the latter as a "rear end side coexistent area". In addition, in an area in which switching between the one-pass printing and the two-pass printing is made in the normal process, raster lines formed by the one-pass printing and raster lines formed by the two-pass printing coexist. This area is also referred to as a "one-pass and two-pass coexistent area" (see FIG. 20, described later).

Correction Values

Inconsistent Density in Printed Image

As described above, in the printer 100, an image is printed by repeating the dot forming operation and the transport operation. Furthermore, the ejection characteristics of each nozzle Nz are moderated by performing the interlace printing, thereby improving image quality. However, recent demand for higher image quality is so strong that further improvement of image quality is demanded for images obtained by the interlace printing. Here, inconsistent density (banding) in the printed image, which deteriorates image quality, is described. This inconsistent density appears as stripes parallel to the carriage movement direction (for the sake of convenience, also referred to as "lateral stripes"). In other words, inconsistent density occurs in the transport direction of the paper S.

Figure 9A:
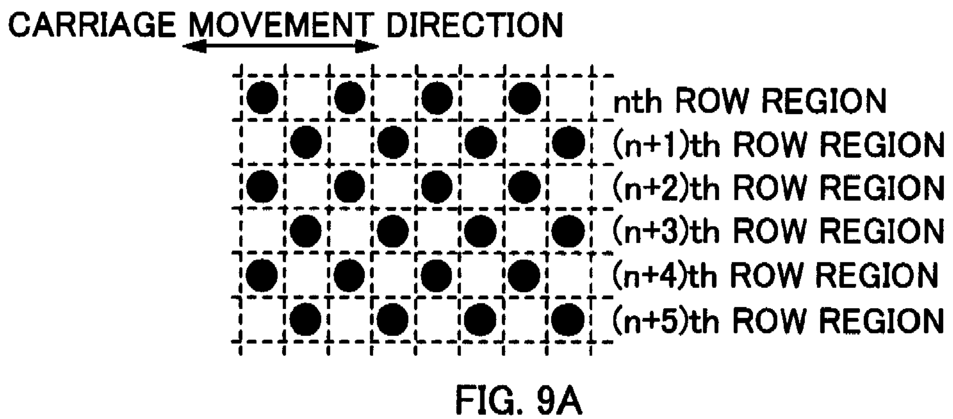
FIG. 9A is a diagram illustrating a dot group formed with ideal ejection characteristics.

In the example shown in FIG. 9A, since the ejection characteristics are ideal, ink ejected from the nozzles Nz lands on the unit regions virtually defined on the paper S with good location accuracy. Specifically, a center of the unit region and a center of the dot coincide. A raster line is constituted by a plurality of dots lined up in the carriage movement direction. In this example, when the image density of the printed image is compared using the row region as a unit, the image density of each row region is consistent. Here, the "row region" refers to a region constituted by a plurality of unit regions arranged in the movement direction of the nozzles Nz (the carriage movement direction). For example, if the print resolution is 720 dpi×720 dpi, the row region is a band-like region with a width in the transport direction of 35.28 μm (≈1/720 inch). Since an image is constituted by a plurality of raster lines adjacent to one another in the transport direction, a plurality of the row regions are also defined adjacent to one another in the transport direction of the paper S (the direction intersecting the carriage movement direction). For the sake of convenience, in the following description, each image divided by the row regions is also referred to as an image piece. Here, the raster line is a row of dots formed as a result of ink landing on the sheet S. On the other hand, the image piece is a piece cut out from the printed image in a unit of row region. The raster line and the image piece differ in this respect.

Figure 9B:
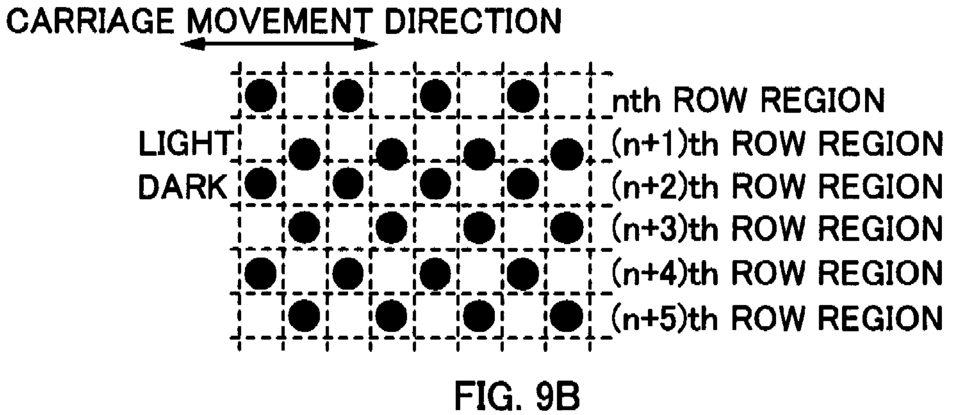
FIG. 9B is a diagram illustrating influence of variance in ejection characteristics.

In the example shown in FIG. 9B, due to influence of the ejection characteristics, a raster line associated with an (n+1) th row region is formed at a position closer to an (n+2)th row region side (the lower side in FIG. 9B) than the normal position. Accordingly, the density of the image pieces varies. For example, a density of an image piece corresponding to the (n+1)th row region is lower than a density of an image piece corresponding to the standard row region (an nth or an (n+3)th row region, for example). In addition, a density of an image piece corresponding to the (n+2) th row region is higher than the density of the image piece corresponding to the standard row region.

Figure 10:
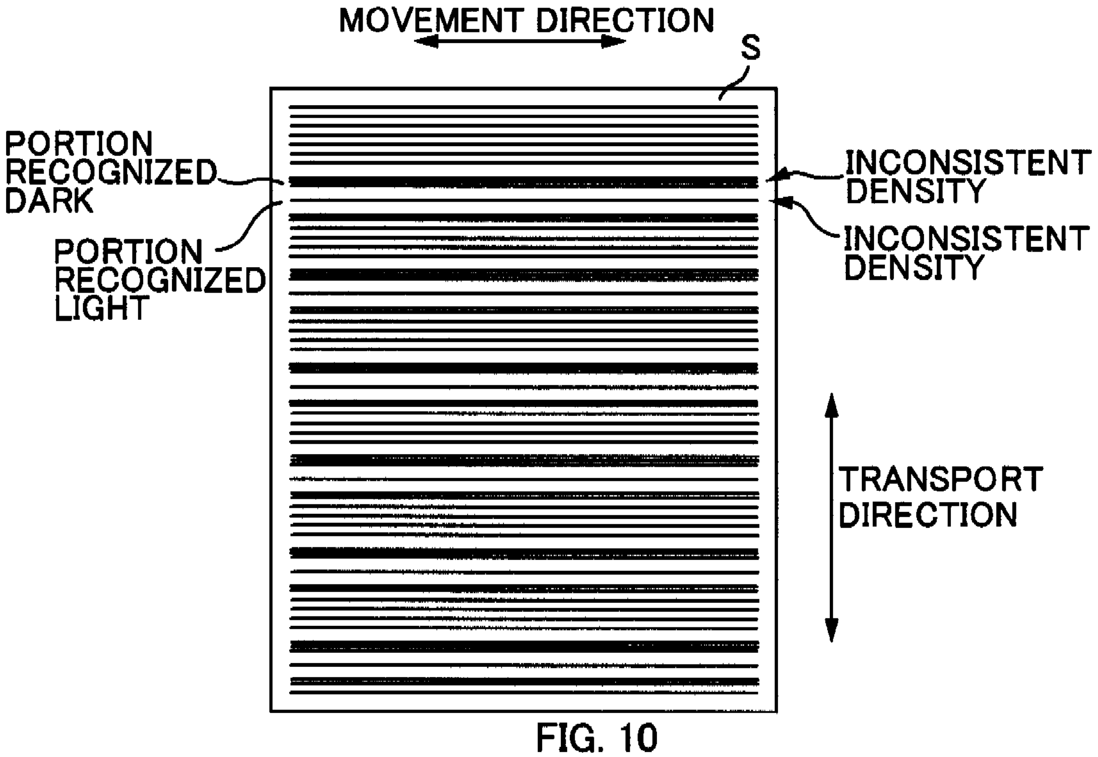
FIG. 10 is a conceptual diagram for illustrating inconsistent density.

As shown in FIG. 10, variance in the density of image pieces is recognized as inconsistent density in the form of lateral stripes, as seen macroscopically. In other words, image pieces in an area in which a spacing between adjacent raster lines is relatively wide macroscopically appear lighter; whereas image pieces in an area in which a spacing between raster lines is relatively narrow macroscopically appear darker. This inconsistent density causes deterioration of quality of printed images. It should be noted that the cause of this inconsistent density also applies to the other ink colors as well. If even one of the above-described six colors suffers the variance in the density of image pieces, inconsistent density occurs to the image printed by the multi-color printing.

General Description of Correction Values

In order to correct inconsistent density that occurs on a row region basis, in this printer 100, correction values for each row region in which a raster line is formed is stored such that the density of printed image is corrected on a row region basis. For example, for a row region that tends to be recognized as darker than the standard, correction values set so as to form an image piece of that row region lighter are stored. In contrast, for a row region that tends to be recognized as lighter than the standard, correction values set so as to form an image piece of that row region darker are stored. These correction values are referenced in processes in accordance with the printer driver 216, for example. For example, the CPU 211 of the host computer 200 corrects CMYK pixel data in multiple tone values based on the correction values in the color conversion process. The corrected CMYK pixel data is subjected to the halftone process. In short, tone values are corrected based on the correction values. In this manner, an ejection amount of ink is adjusted to suppress variance in the density of each image piece. It should be noted that in the example shown in FIG. 9B, the image piece corresponding to the (n+2) th row region appears dark because a spacing between adjacent raster lines is narrower than a normal spacing. More specifically, the (n+1)th raster line that should be originally formed in the middle in the transport direction of the (n+1)th row region is shifted to the side of the (n+2)th row region, and therefore a corresponding image piece becomes darker. For this reason, when the inconsistent density is considered based on the image piece, it is necessary to consider raster lines formed in adjacent row regions as well.

Figure 11:
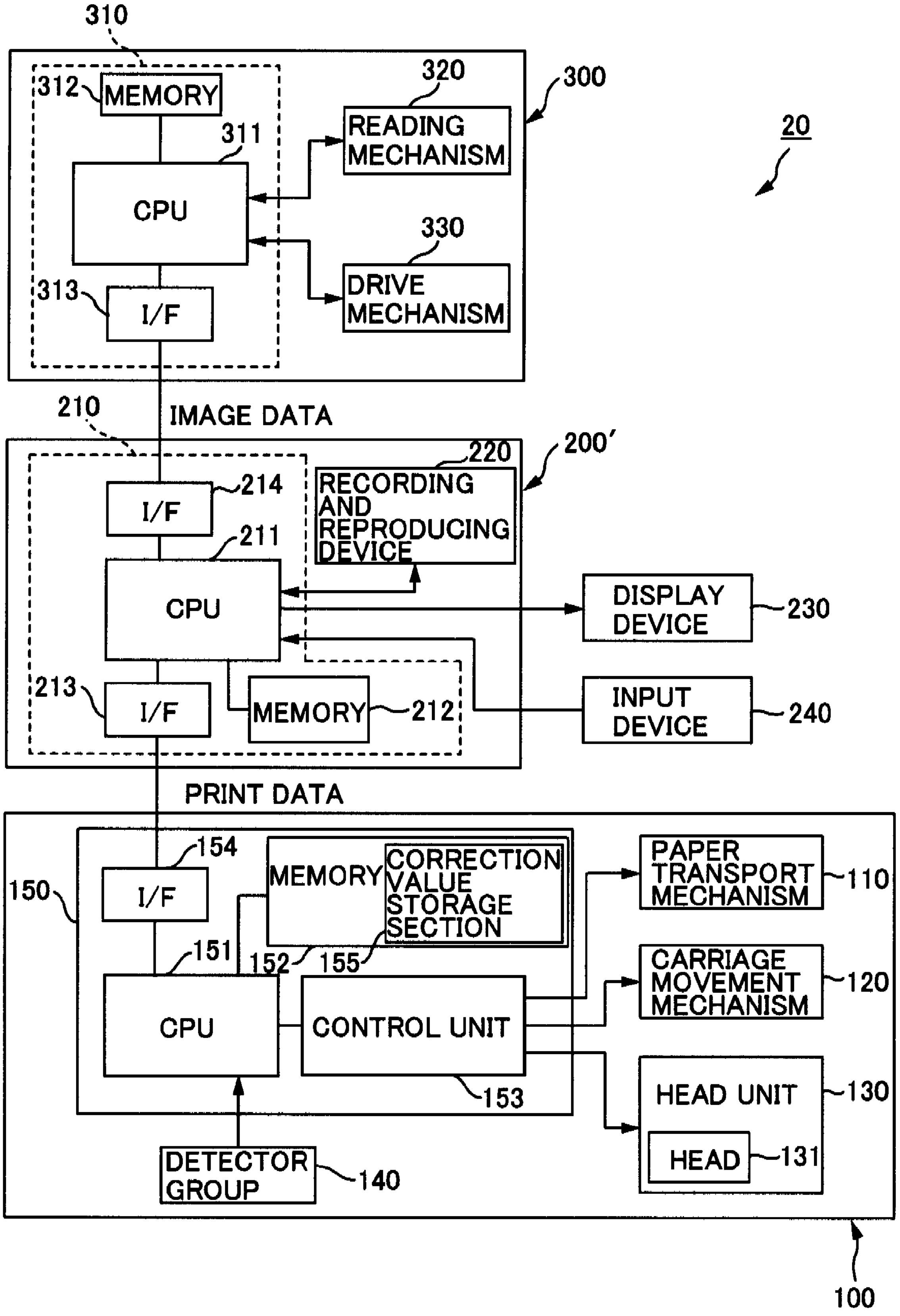
FIG. 11 is a block diagram illustrating a configuration of a correction value setting system.

The correction values for each row region are set based on the measured density values by a scanner 300 (see FIG. 11). For example, in an inspection process of a printer manufacturing factory, the printer 100 is caused to print a test pattern CP (see FIG. 16) first, and the density of the printed test pattern CP is read by the scanner 300. Then, the correction values for each row region are obtained based on the measured values (read densities) corresponding to each image piece. The obtained correction values are stored in the correction value storage section 155 of the printer-side controller 150. The printer 100 in which the correction valued are stored is used by a user. At that time, the host computer 200 connected to the printer 100 (specifically, the host-side controller 210 that executes the printer driver 216) uses the correction values read out from the correction value storage section 155 and corrects pixel data in multiple tone values on a row region basis. Furthermore, the host-side controller 210 generates print data based on the corrected tone values. This print data is transmitted to the printer 100. As a result, the image printed by the printer 100 has a high image quality with reduced inconsistent density that appears in the form of lateral stripes.

In the above-described normal process, the combination of a row region and a nozzle Nz has a periodicity, which is because the paper S is transported by a constant transfer amount. Therefore, the correction values used for the normal process are set for the number of types that corresponds to one cycle. In the example of FIG. 8, one cycle corresponds to seven row regions. Therefore, seven types of correction values, which correspond respectively to the seven row regions, are set for the normal process (for the sake of convenience, also referred to as "normal process area correction values"). Then, the host-side controller 210 that executes the printer driver 216 applies a group of correction values in a repeated manner in the color conversion process.

Incidentally, during the normal process, the printing mode is switched from the one-pass printing to the two-pass printing. Along with this, in an area in which the printing mode is switched, the combination of a row region and a nozzle Nz used for performing printing in the row region is changed. For example, in the one-pass and two-pass coexistent area, a ratio of raster lines formed by the two-pass printing increases on the further downstream side of the paper S. Consequently, if the normal process area correction values are applied in the area as they are, the image quality may deteriorate.

In view of this, in this printer 100, with respect to the one-pass and two-pass coexistent area (corresponding to another area) that is provided on the upstream side in the transport direction from a one-pass printing area (corresponding to a certain area) in which printing is performed by the one-pass printing only, and that is provided between the one-pass printing area and a two-pass printing area in which printing is performed by the two-pass printing only, an ink ejection amount is corrected based on attenuation area correction values (corresponding to another correction values), which are obtained by reducing a degree of the correction based on the normal process area correction values (corresponding to correction values for a first type row region) as the distance from the one-pass printing area increases. By employing such a configuration, it is possible in the one-pass and two-pass coexistent area, to reduce the degree of the correction based on the normal process area correction values as the distance from the one-pass printing area increases. As a result, appropriate correction can be performed on the side close to the one-pass printing area, while adverse effects of the correction can be avoided on the side distant therefrom. Furthermore, it is also possible to prevent deterioration of the image quality caused by a rapid change in the correction values. As a result, the image quality can be improved. Detailed description will be provided below.

Correction Value Setting System 20

In order to describe setting of correction values, a correction value setting system 20 used for setting the correction values is described first. As shown in FIG. 11, the correction value setting system 20 includes the scanner 300 and a process host computer 200'.

Scanner 300

The scanner 300 includes a scanner-side controller 310, a reading mechanism 320, and a movement mechanism 330. The scanner-side controller 310 includes a CPU 311, a memory 312, and an interface section 313. The CPU 311 performs the overall control of the scanner 300. The CPU 311 is communicably connected to the reading mechanism 320 and the movement mechanism 330. The memory 312 is for reserving an area for storing computer programs and a working area, for instance, and is constituted by a RAM, an EEPROM, a ROM, and the like. The interface section 313 is interposed between the process host computer 200' and the scanner 300 for data exchange. In the present embodiment, the interface section 313 of the scanner 300 is connected to the second interface section 214 of the process host computer 200'.

Figure 12A:
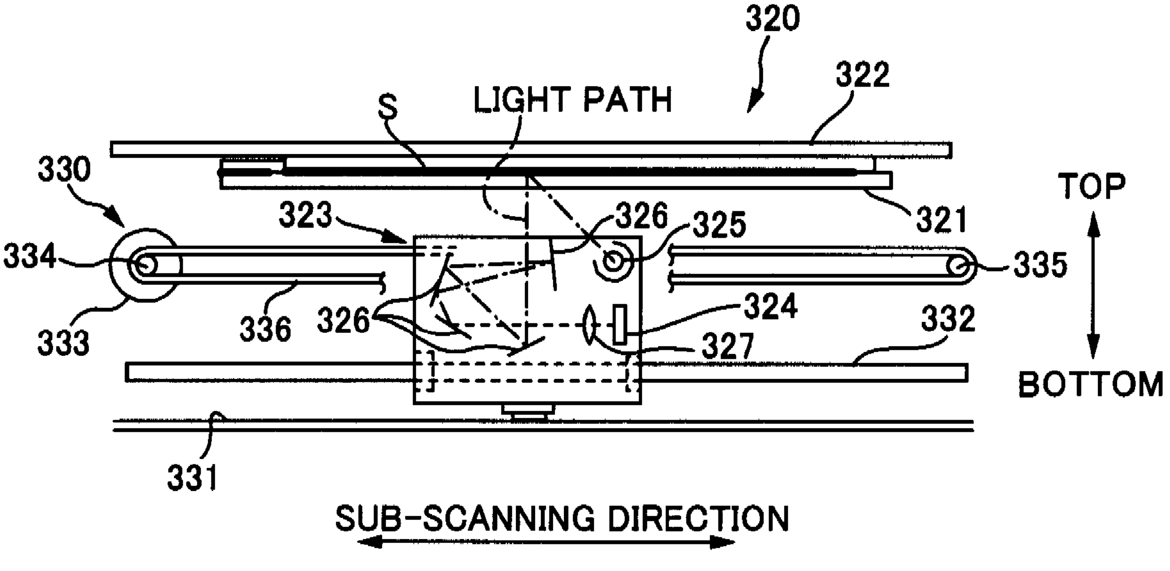
FIG. 12A is a front view illustrating a structure of a scanner.
Figure 12B:
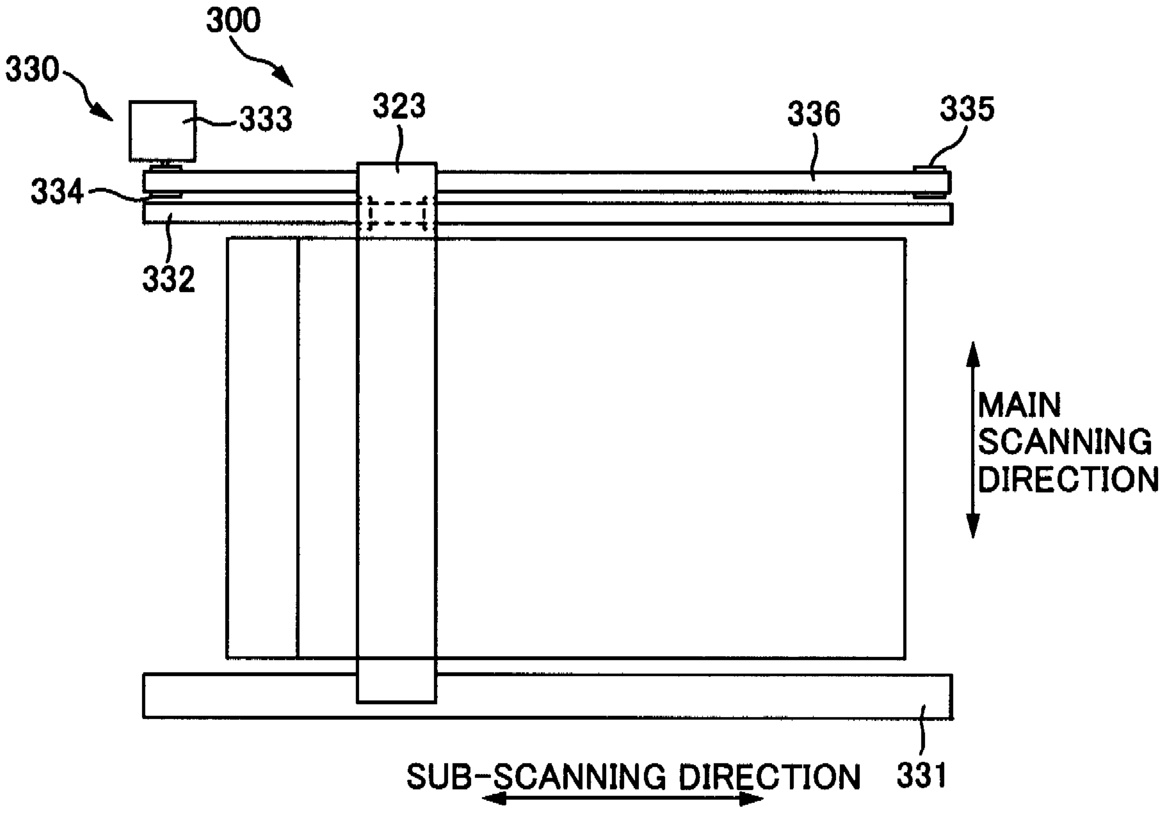
FIG. 12B is a plan view illustrating the structure of the scanner.

As shown in FIGS. 12A and 12B, the reading mechanism 320 includes a document table glass 321, a document table cover 322, and a reading carriage 323. The reading carriage 323 opposes a face to be read of a document (paper S on which the test pattern CP is printed) via the document table glass 321, and is moved along the document table glass 321 in a predetermined direction. In this reading carriage 323, the image density is measured with a CCD image sensor 324. The CCD image sensor 324 includes a plurality of CCDs disposed so as to correspond to the reading width along a direction intersecting a movement direction of the reading carriage 323 (in the present embodiment, a direction perpendicular to the movement direction). Then, light from an exposure lamp 325 is reflected on the document, and the reflected light is guided by a plurality of mirrors 326. Then, the guided light is collected by a lens 327 so as to enter each CCD. In this way, it is possible to obtain density data that indicates the image density. In short, the image density is measured.

The movement mechanism 330 is for moving the reading carriage 323. The movement mechanism 330 includes a support rail 331, a regulating rail 332, a drive motor 333, a drive pulley 334, an idler pulley 335 and a timing belt 336. The support rail 331 supports the reading carriage 323 so as to be movable. The regulating rail 332 regulates the movement direction of the reading carriage 323. The drive pulley 334 is attached to a rotation shaft of the drive motor 333. The idler pulley 335 is disposed in an end portion on the opposite side to the drive pulley 334. The timing belt 336 is stretched around the drive pulley 334 and the idler pulley 335, and part of which is affixed to the reading carriage 323.

In the scanner 300 configured as described above, the reading carriage 323 is caused to move along the document table glass 321 (that is, a face to be read of the document) such that voltages output from the CCD image sensor 324 are obtained at a predetermined cycle. In this manner, the density of the document can be measured for a distance by which the reading carriage 323 has moved during one cycle.

Process Host Computer 200'

The process host computer 200' is configured in a similar manner to the host computer 200 of the printing system 10. Therefore, the same reference numerals are assigned to the same components, and description thereof is omitted. A major difference between the process host computer 200' and the host computer 200 lies in computer programs installed thereon. Specifically, a process program is installed on the process host computer 200' as an application program. This process program causes the process host computer 200' to implement, for example, a function to cause the printer 100 for which the correction values are to be set to print the test pattern CP, a function to control the scanner 300 so as to obtain measured density values of the test pattern CP, and a function to set correction values for each row region based on the measured density values.

Figures 13, 14:
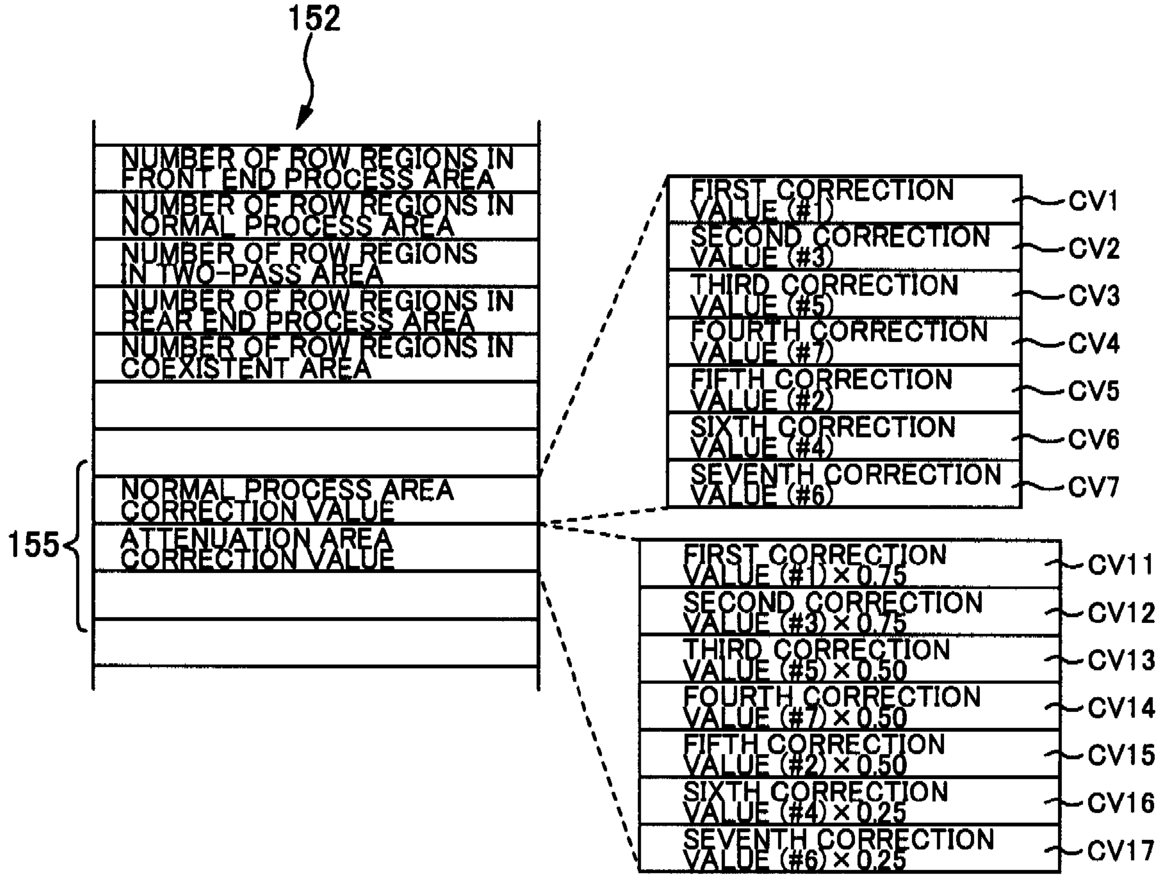
FIG. 13 is a conceptual diagram of a measured value data table provided in a process host computer.
FIG. 14 is a conceptual diagram of a correction value storage section provided in a memory of the printer.

A printer driver for controlling the printer 100 and a scanner driver for controlling the scanner 300 are also installed on the process host computer 200'. Also as shown in FIG. 13, a partial region of the memory 212 of the process host computer 200' is used as a data table for storing the density data (measured values). In addition, the process host computer 200' causes the obtained correction values to be stored in the correction value storage section 155 of a target printer 100.

As shown in FIG. 14, in the correction value storage section 155, a region for storing the normal process area correction values and a region for storing the attenuation area correction values are provided. Furthermore in the memory 152 of the printer 100, in addition to the correction value storage section 155, a region for storing the number of row regions in the front end process area, a region for storing the number of row regions in the normal process area, a region for storing the number of row regions in the two-pass printing area, a region for storing the number of row regions in the rear end process area, and a region for storing the number of row regions in the one-pass and two-pass coexistent area are also provided.

Process at Manufacturing Factories of Printers

Printing of Test Pattern CP

Next, processes performed in the printer manufacturing factory are explained. It should be noted that the correction value setting process described below is realized by computer programs installed on the process host computer 200', namely, the correction value setting program, scanner driver, and printer driver. Therefore, these computer programs contain program code to carry out the correction value setting process.

Prior to the correction value setting process, an operator of the factory connects the printer 100 for which the correction values are to be set to the process host computer 200'. The correction value setting program installed on the process host computer 200' causes the CPU 212 to perform the correction value setting process and processes related thereto. These processes includes, for example, a process for causing the printer 100 to print the test pattern CP, a process for subjecting the density data obtained from the scanner 300 to image processing or analyzing, etc., and a process for the set correction values to be stored in the correction value storage section 155 of the printer 100.

Figure 15A:
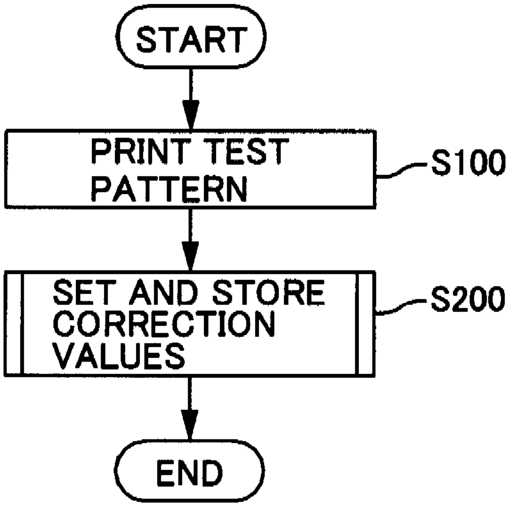
FIG. 15A is a flowchart illustrating a correction value setting process performed in an inspection process for manufactured printers.

After the printer 100 is connected, as shown in FIG. 15A, the test pattern CP is printed (S100). This printing step is performed upon instruction by the operator. In this printing step, the CPU 212 of the process host computer 200' generates print data for the test pattern CP. The print data generated by the CPU 212 is transmitted to the printer 100. Based on the print data from the process host computer 200', the printer 100 prints the test pattern CP on the paper S. This printing operation is carried out in accordance with the aforementioned processes (see FIG. 7). Describing simply, this printing operation is performed by repeating the dot forming operation (S030) and the transport operation (S040) in accordance with the print data. That is, in the dot forming operation, ink is ejected toward the paper S while the head 131 is caused to move in the carriage movement direction. In the transport operation, the paper S is transported in the transport direction. In this stage, no correction value is stored in the correction value storage section 155. For this reason, the printed test pattern CP reflects ejection characteristics of each nozzle Nz.

Test Pattern CP

Figure 16:
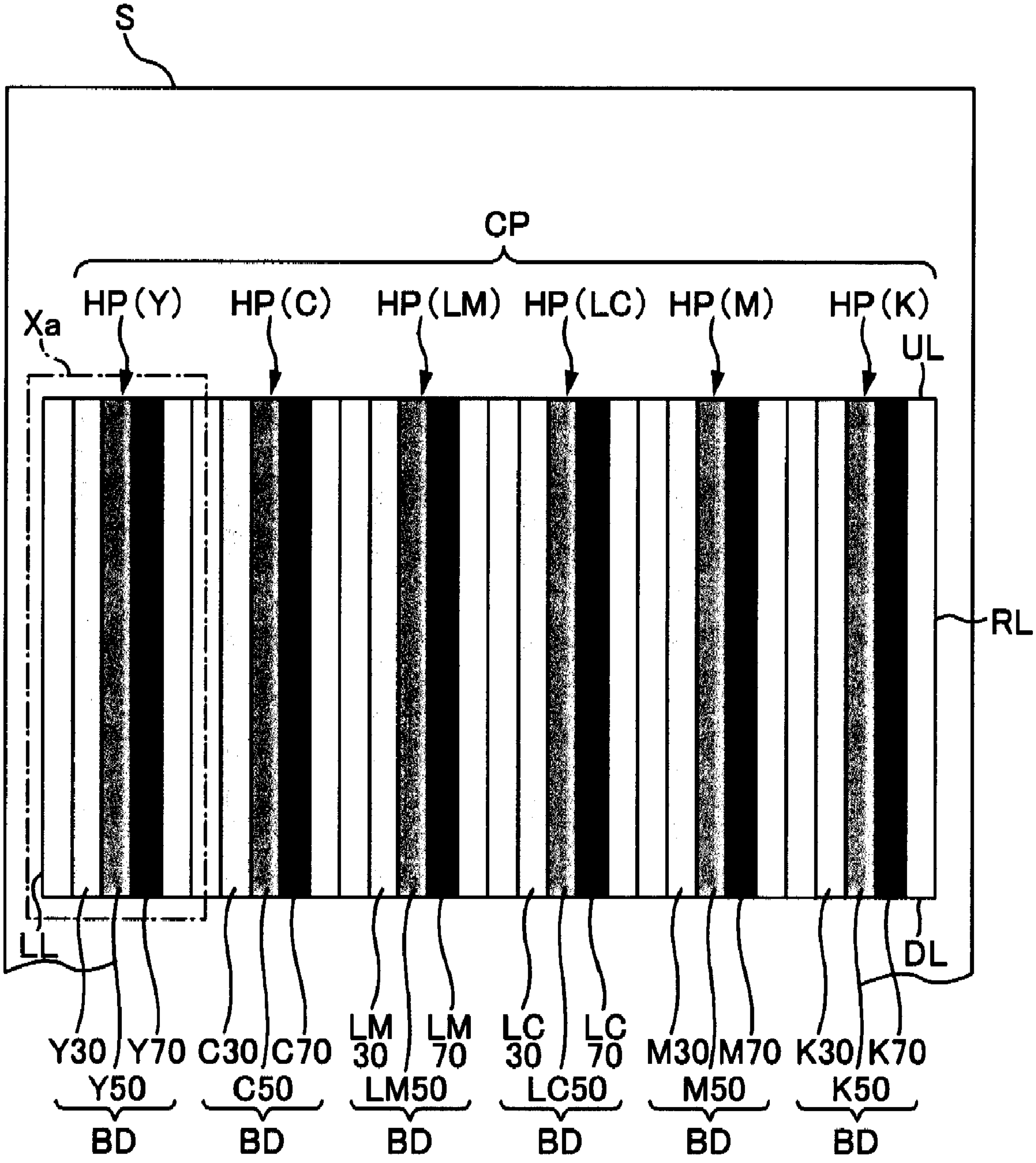
FIG. 16 is an explanatory diagram of a test pattern.

The printed test pattern CP is described next. It should be noted that the test pattern CP is constituted by a plurality of correction patterns HP. A single correction pattern HP represents a portion that is printed using a nozzle row (a nozzle group) that can eject the same type of ink, and corresponds to a sub pattern. This correction pattern HP is used to evaluate variance in density. As described above, the head 131 of the printer 100 has six nozzle rows including the black ink nozzle row Nk, the yellow ink nozzle row Ny, the cyan ink nozzle row Nc, the magenta ink nozzle row Nm, the light cyan ink nozzle row Nlc, and the light magenta ink nozzle row Nlm. Accordingly, as shown in FIG. 16, the test pattern CP includes six correction patterns HP(Y) to HP(K) respectively corresponding to the six nozzle rows. These correction patterns HP(Y) to HP(K) are disposed (printed) lined up in the carriage movement direction.

Figure 17:
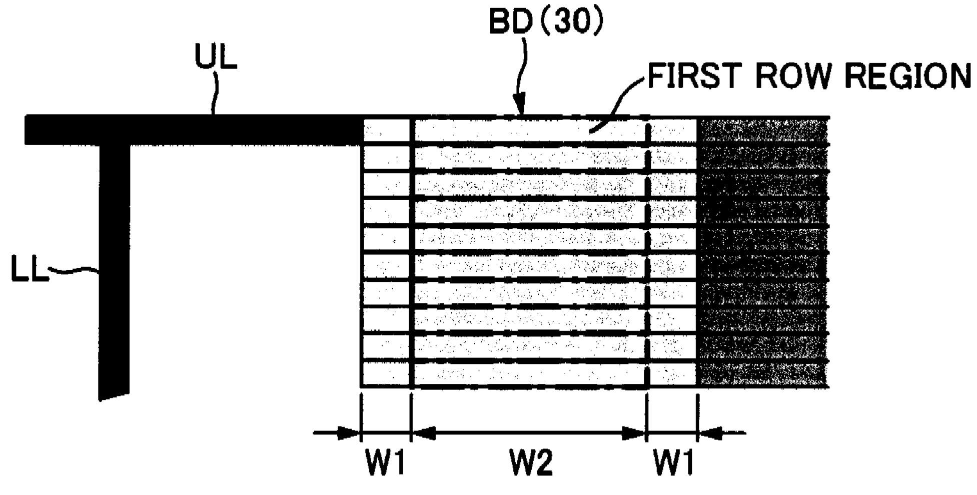
FIG. 17 is an explanatory diagram showing part of a correction pattern.

As shown in FIGS. 16 and 17, each of the correction patterns HP (Y) to HP (K) is constituted by plural types of band-like patterns BD, an upper ruled line UL, a lower ruled line DL, a left ruled line LL, and a right ruled line RL. The band-like pattern BD corresponds to a region in which printing at different densities is performed, and has a band-like shape elongated in the transport direction. The band-like pattern BD of the present embodiment is constituted by three types of patterns, each of which is printed at different instructed density value. Therefore, it can be said that the test pattern CP includes a plurality of groups (groups of regions) each of which consists of a plurality of band-like patterns BD printed at different instructed density values, such that the number of the groups corresponds to the number of nozzle rows.

For example, a correction pattern (Y) printed with the yellow ink nozzle row Ny includes a band-like pattern BD(Y30) printed at 30% density, a band-like pattern BD(Y50) printed at 50% density, and a band-like pattern BD(Y70) printed at 70% density. For the sake of convenience, in the following description, when description is provided on the correction pattern HP without specifying the nozzle row used for printing the same, the correction pattern HP is simply referred to as the "correction pattern HP". Similarly, when description is provided on each band-like pattern BD without specifying the nozzle row used for printing the same, the band-like pattern BD printed at 30% density is referred to as the band-pattern BD(30), that at 50% density as the band-pattern BD(50), and that at 70% density as the band-pattern BD(70), respectively.

These band-like patterns BD(30) to BD(70) are band-like areas elongated in the transport direction, and are disposed lined up in the carriage movement direction. It should be noted that in the present embodiment, during the process, the same color of ink (also referred to as "process ink") is ejected from the respective nozzle rows. The process ink has a color of, for example, light magenta. The densities of the correction patterns HP(Y) to HP(K) printed on the paper S becomes inconsistent, depending on the characteristics of the respective nozzles Nz constituting the nozzle rows, even if the correction patterns HP(Y) to HP(K) are printed with the same color of ink. By setting the correction values so as to suppress the inconsistent density, the inconsistent density can be suppressed when a user performs multi-color printing.

As described above, when an image is printed, the front end process, normal process, and rear end process are performed. Each correction pattern HP is also printed by the front end process, normal process, and rear end process. That is, each correction pattern HP includes the front end process area in which the pattern is formed by the front end process, the normal process area in which the pattern is formed by the normal process, and the rear end process area in which the pattern is formed by the rear end process. In addition to these areas, each correction pattern HP includes coexistent areas (a front end side coexistent area and a rear end side coexistent area) in which the pattern is formed by plural processes.

In image printing performed by the user, the number of row regions that constitute the normal process area is, in case of A4 size for example, approximately several thousands. However, the combination of the nozzles Nz that are used for each row region in the normal process area has a periodicity, and therefore it is not necessary to print the entire area thereof. Thus in the present embodiment, the length in the transport direction of the normal process area in each correction pattern HP is set so that row regions corresponding to a plurality of cycles are included in the correction pattern HP, for example, a length corresponding to eight cycles.

Also, in the correction pattern HP, as shown in FIG. 17, the upper ruled line UL is formed by the first row region in the band-like pattern BD. Similarly, the lower ruled line DL is formed by the last row region in the band-like pattern BD.

Initial Setting of Scanner 300

Figure 15B:
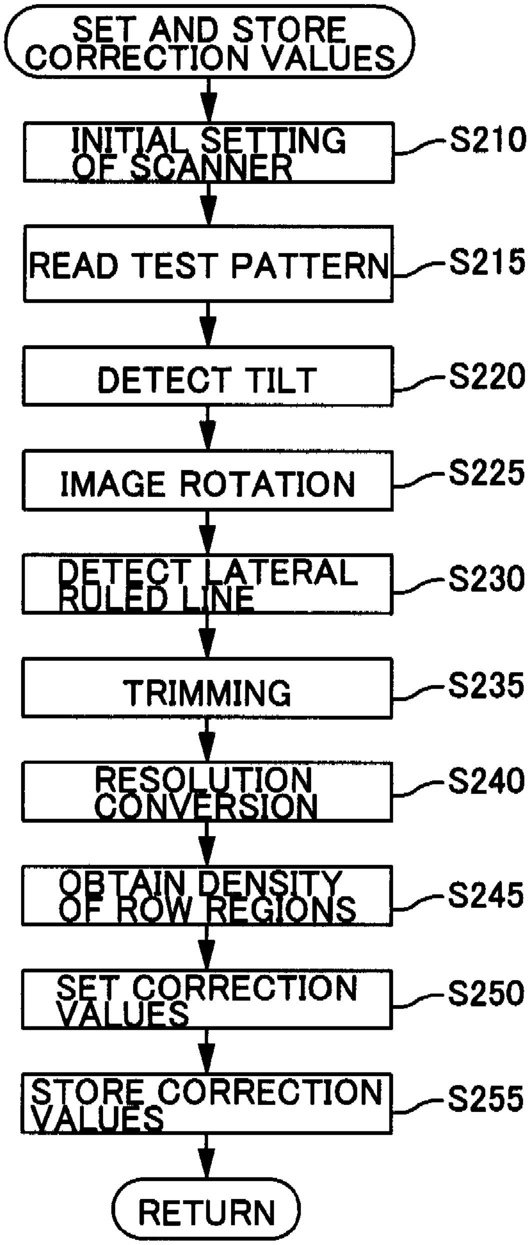
FIG. 15B is a flowchart illustrating steps for setting and storing correction values in the correction value setting process.

After the test pattern CP is printed, a process for setting correction values and storing them in the printer 100 is carried out (S200). This process is described below. As shown in FIG. 15B, in this process, the initial setting of the scanner 300 is carried out first (S210). In the initial setting, necessary items such as reading resolution of the scanner 300 and type of the document are set. Of these items, the reading resolution of the scanner 300 is required to be higher than the print resolution. Preferably, the reading resolution is set to an integer multiple of the print resolution. In the present embodiment, since the print resolution of the test pattern CP is 720 dpi, the reading resolution of the scanner 300 is set to 2880 dpi, four times the print resolution. The type of the document is set to the reflection copy, the image type is set to 8-bit gray scale, and the save format is set to the bitmap format.

Reading of Test Pattern CP

After the initial setting of the scanner 300 is finished, the test pattern CP is read (S215). In this step, in the scanner 300, the scanner-side controller 310 controls the reading mechanism 320 and the movement mechanism 330 to obtain the density data of the entire paper S. Here, the density data is obtained along the longitudinal direction of the band-like pattern BD. Then, the scanner 300 outputs the obtained density data to the process host computer 200'. It should be noted that the density data obtained as described above becomes data indicating the density of each pixel (in this case, a region in the size determined by the reading resolution), and constitutes an image. For this reason, in the following description, data obtained by the scanner 300 is also referred to as image data. Also, the density data for each of the pixels that constitute the image data is also referred to as pixel density data. The pixel density data is constituted by the tone values representing the density.

Upon receiving image data from the scanner 300, the host-side controller 210 of the process host computer 200' cuts out from the received image data a predetermined range thereof corresponding to each of the correction patterns HP. The predetermined range is defined as a rectangular range in a size that is slightly larger than each of the correction patterns HP. In the present embodiment, six pieces of image data is cut out corresponding to each of the six correction patterns HP. For example, with regard to the correction pattern HP(Y) formed with the nozzle row that ejects yellow ink, the image data of the range indicated by the sign Xa in FIG. 16 is cut out.

Correction of Tilt of Correction Pattern HP

Next, the host-side controller 210 detects a tilt θ of the correction pattern HP in image data (S220), and performs a rotation process according to the tilt θ on the image data (S225). For example, the host-side controller 210 obtains the image densities of the upper ruled line UL at plural positions that are different in the width direction of the paper S, and detects the tilt θ of the correction pattern HP based on these image densities. Then, the host-side controller 210 performs the rotation process on the image data based on the detected tilt.

Trimming of Correction Pattern HP

The host-side controller 210 then detects lateral ruled lines (the upper ruled line UL and the lower ruled line DL) from the image data of each correction pattern HP (S230), and performs trimming (S235). The host-side controller 210 obtains the image density data for pixels in the predetermined range from the image data that has undergone the rotation process. Then, the upper ruled line UL is recognized based on the image density, and a portion above the upper ruled line UL is removed by trimming. Similarly, the lower ruled line DL is recognized based on the image density, and a portion below the lower ruled line DL is removed by trimming.

Resolution Conversion

After trimming, the host-side controller 210 converts the resolution of the image data that has been subjected to trimming (S240). In this process, the resolution of the image data is converted so that the number of pixels in the Y-axis direction (the transport direction, a direction in which the row regions are lined up) in the image data is equal to the number of raster lines constituting the correction pattern HP. For example, it is assumed that the correction pattern HP printed at the resolution 720 dpi is read at the resolution 2880 dpi. In this case, in an ideal state, the number of pixels in the Y-axis direction in the image data is four times the number of raster lines constituting the correction pattern HP. However, actually, there are cases in which the number of the raster lines does not match the number of pixels due to various effects such as error in printing or reading. Resolution conversion is carried out on the image data in order to solve such a mismatch. In this resolution conversion process, a conversion magnification is calculated based on the ratio between the number of raster lines that constitute the correction pattern HP and the number of pixels in the Y-axis direction of the image data after trimming. Then, the resolution conversion process is carried out with the calculated magnification. Bicubic interpolation or other various methods can be used for resolution conversion. As a result, the number of pixels lined up in the Y-axis direction becomes equal to the number of row regions, and the pixel rows lined up in the X-axis direction and the row regions correspond to each other one by one.

Obtaining Density of Each Row Region

Figure 18:
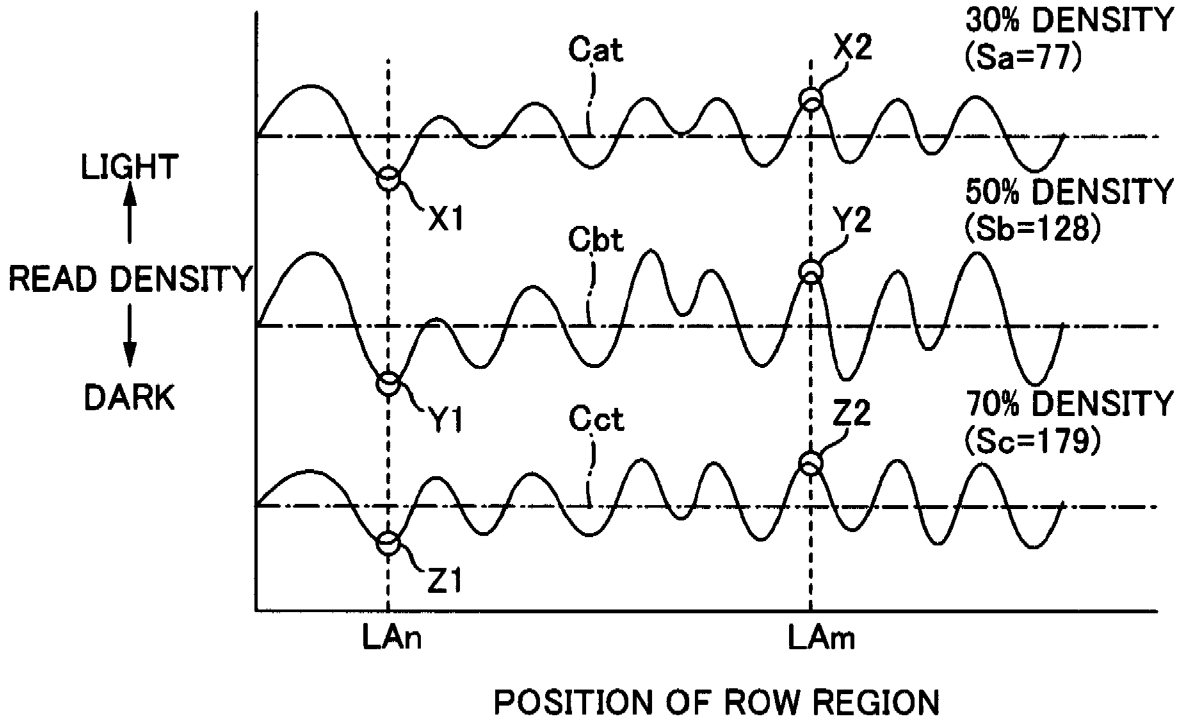
FIG. 18 is a diagram showing measured values of respective band-like patterns on a row region basis.

Next, the host-side controller 210 obtains the density of each row region in the correction pattern HP (S245). In obtaining the density of each row region, the host-side controller 210 obtains a position of a centroid of a vertical ruled line (in this case, the left ruled line LL) that serves as the reference, and specifies pixels constituting each band-like pattern BD using the centroid position of the left ruled line LL as the reference. Then, the pixel density data for those specified pixels is obtained. For example, for the band-like pattern BD(30) printed at 30% density, as shown in FIG. 17, the pixel density data is obtained for each pixel in a central range W2 excluding both end portions indicated by the sign W1. The average value of the obtained pixel density data is used as the measured value of the first row region for 30% density. Similarly, measured values are obtained for the second type row region and other band-like patterns BD as well. The measured values correspond to the measured density values by the scanner 300. The obtained measured values are stored in the data table (see FIG. 13) of the memory 212 of the host-side controller 210. That is, the measured values are stored in an area specified by the type of nozzle row, the print density of the pattern, and the row region number. It should be noted that the densities 1 through 3 in FIG. 13 represent densities of the band-like patterns BD. For example, density 1 corresponds to 30% density, density 2 to 50% density, and density 3 to 70% density. When the measured values stored in the data table are plotted on the vertical axis, and the position of the row region is plotted on the horizontal axis, the graph shown in FIG. 18 is obtained for example.

Setting of Correction Values

After the measured values of the respective row regions are obtained, the host-side controller 210 sets correction values on a row region basis (S250). As described above, a single band-like pattern BD is printed at the same instructed tone value. However, the obtained measured values of the respective row regions vary. This variance causes inconsistent density in printed images. In order to eliminate the inconsistent density, it is required to make the measured values of the respective row regions to be uniform as much as possible for each band-like pattern BD. From this point of view, the correction values are set on a row regions basis based on the measured values of the respective row regions. As described above, the test pattern CP includes a plurality of correction patterns HP(Y) to HP(K) printed with each type of the nozzle rows, and each of the correction patterns HP (Y) to HP (K) includes band-like patterns BD printed at different predetermined densities. The respective band-like patterns BD(30) to BD(70) have a plurality of row regions. That is, a plurality of row regions are provided lined up in the transport direction in the band-like pattern SD (a region printed at a predetermined density). Therefore, the correction values are set for each of different colors, different densities, and row regions.

Figure 19:
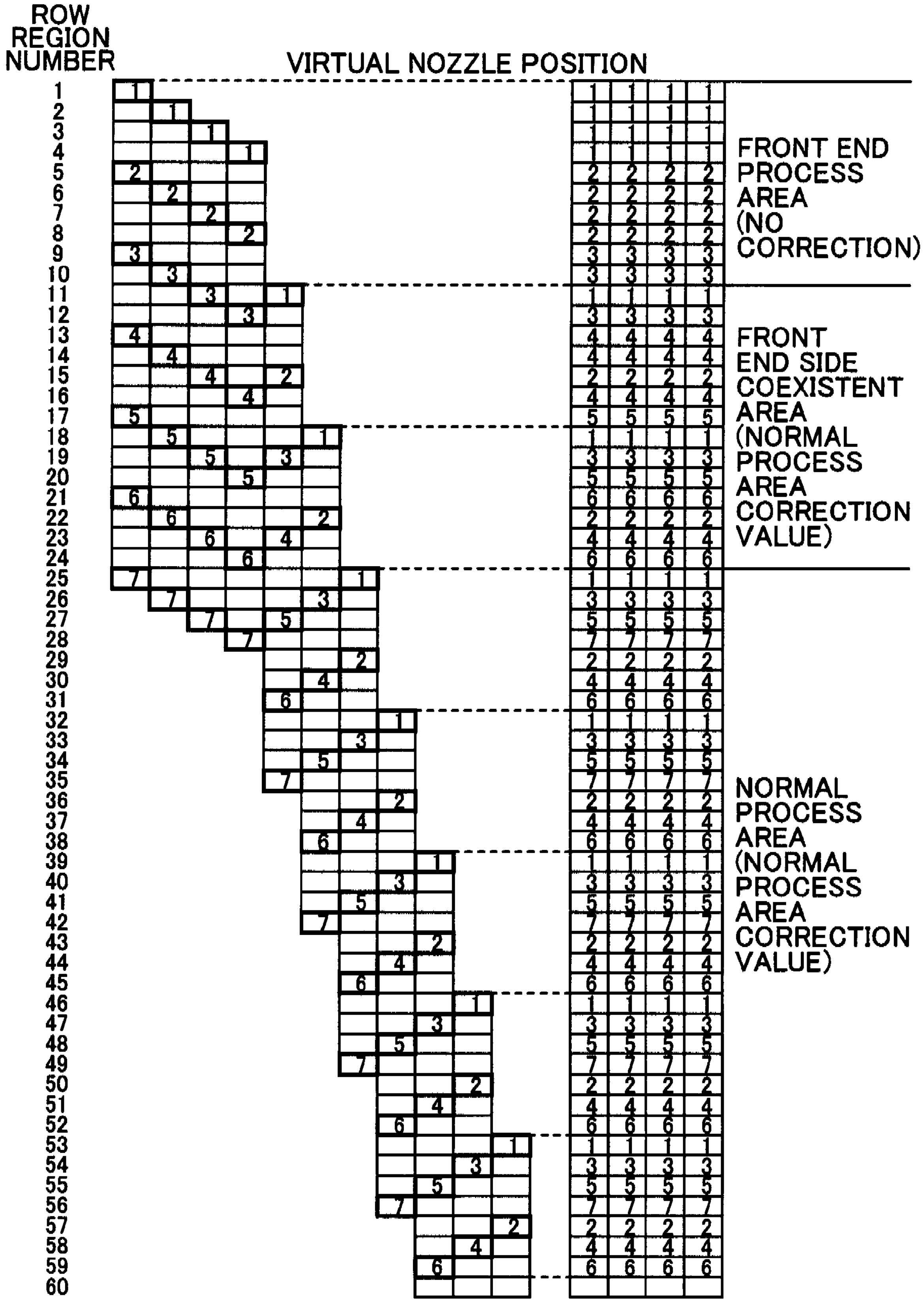
FIG. 19 is a diagram illustrating setting of the correction values from a front end process area to a normal process area.
Figure 20:
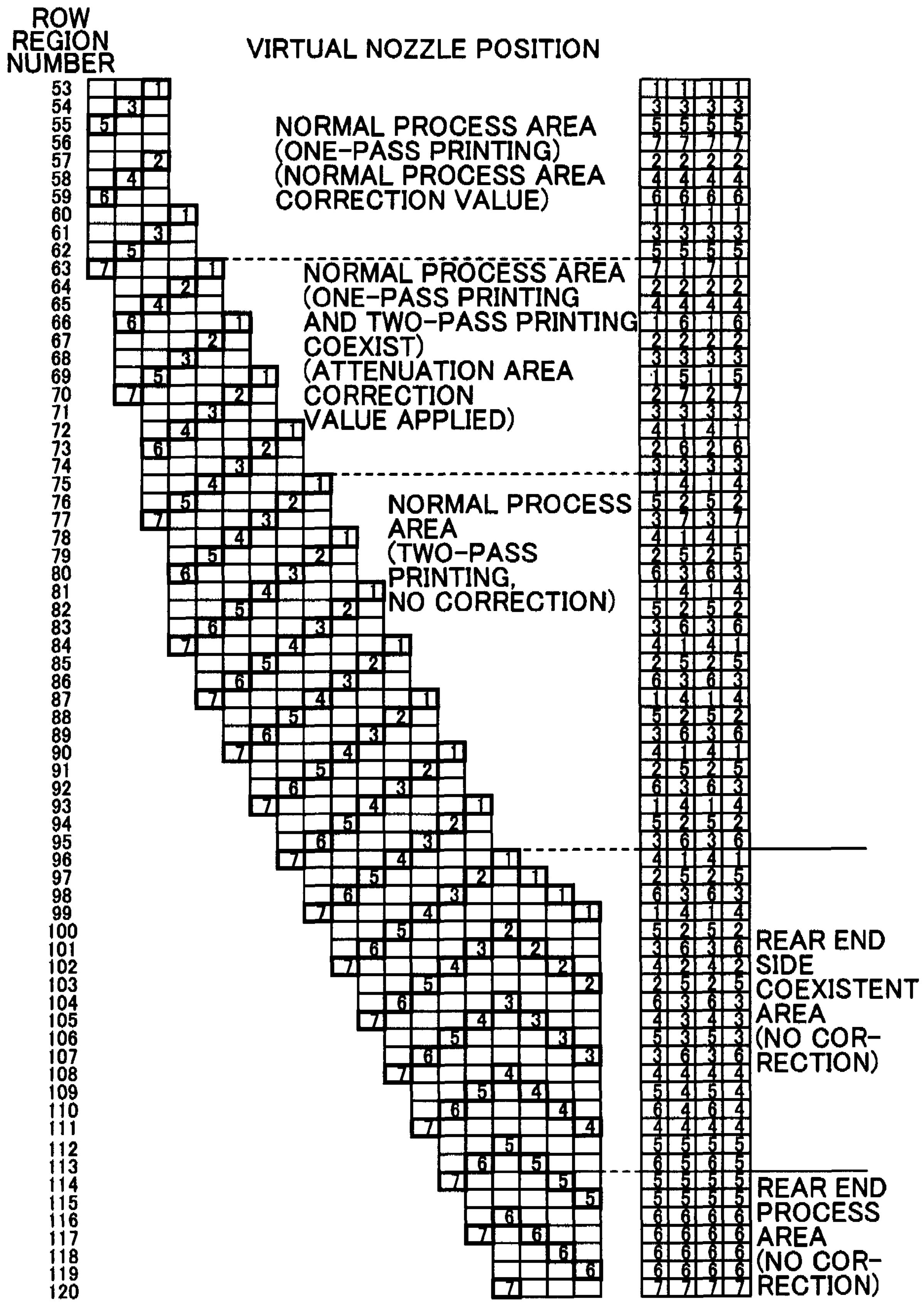
FIG. 20 is a diagram illustrating setting of the correction values from the normal process area to a rear end process area.

As shown in FIGS. 19 and 20, in this printer 100, correction based on the correction values is not performed in the front end process area, the two-pass printing area in the normal process area, the rear end side coexistent area, and the rear end process area. And in the front end side coexistent area and the one-pass printing area in the normal process area, the ink ejection amount is corrected based on the normal process area correction values. Also in the one-pass and two-pass coexistent area in the normal process area, the ink ejection amount is corrected based on the attenuation area correction values obtained using the normal process area correction values and attenuation coefficients. Accordingly, the correction value setting system 20 sets the normal process area correction values and attenuation area correction values, which is stored in the printer 100. Setting of these correction values is described below.

Setting of Normal Process Area Correction Values

Firstly, setting of the normal process area correction values is described. As described above, the normal process area correction values are mainly used in the normal process, and correspond to correction values for a first type row region. In addition, a predetermined number of the normal process area correction values are set based on the number of combinations of row regions and nozzles. When this is described using the example in FIG. 19, in the normal process area, seven combinations of the row regions and the nozzles are set. These seven combinations appear in a cycle. More specifically, a dot row is formed with ink ejected from the first nozzle Nz (#1) in a first row region, and a dot row is formed with ink ejected from a third nozzle Nz (#3) in a second row region. A dot row is formed with ink ejected from a fifth nozzle Nz (#5) in a third row region, and a dot row is formed with ink ejected from a seventh nozzle Nz (#7) in a fourth row region. Similarly, a dot row is formed with ink ejected from the second nozzle Nz (#2) in a fifth row region, a dot row is formed with ink ejected from a fourth nozzle Nz (#4) in a sixth row region, and a dot row is formed with ink ejected from a sixth nozzle Nz (#6) in a seventh row region. Accordingly, in this example, it is sufficient if seven types of the normal process area correction values are set in correspondence with these row regions. That is, as shown in FIG. 14, as the normal process area correction values stored in the correction value storage section 155, seven types of the correction values, namely, from a first correction value CV1 applied to the first row region to a seventh correction value CV7 applied to the seventh row region, are set.

Here, setting of the correction values for the instructed tone value Sb (50% density) in a certain row region is described. First, the host-side controller 210 sets a target density for a density for which correction values are to be set. In this example, for the band-like pattern BD at the density for which the correction values are to be set, an average value of read densities in the respective row regions is set as the target density. In FIG. 18, the density indicated by the sign Cbt is set as the target density. The correction value of a certain row region is determined according to the deviance from the target density. By setting correction values for each of the row regions in this manner, more suitable correction values can be set. This is because the image density in each row region is adjusted to an average density as the target density. This is true to other densities as well. In other words, the density indicated by the sign Cat is set as the target density at 30% density, and the density indicated by the sign Cct is set as the target density at 70% density.

Next, the host-side controller 210 averages measured values in each cycle for each of the first to seventh row regions to obtain the average measured values. As described above, row regions for eight cycles are included in a single band-like pattern BD. Therefore, the host-side controller 210 obtains measured values for the first row region from a first to eighth cycles, and sets an average value thereof as the measured value of the first row region. Similarly, the host-side controller 210 obtains measured values for the second row region of the respective cycles, and sets an average value thereof as the measured value of the second row region. A similar process is performed for the other row regions as well to calculate a measured value (an average value) of each of the row regions.

Next, the host-side controller 210 selects a measured value of a lower side density that is lower than the density for which the correction values are to be set and a measured value of a higher side density that is higher than the density for which the correction values are to be set. In the present embodiment, since the density for which the correction values are to be set is 50% density (an instructed tone value Sb), a measured value of a row region constituting the band-like pattern BD at 30% density is selected as the lower side density. Similarly, a measured value of a row region constituting the band-like pattern BD at 70% density is selected as the higher side density. It should be noted that the row regions selected for the lower side density and for the higher side density are those at the same position as a row region for which correction values are to be set. For example, when correction values are set for the first row region, the measured value of the first row region at 30% density and that of the first row region at 70% density are selected.

After selecting the measured values of the lower side density and of the higher side density, the host-side controller 210 specifies a group of measured values to be referred to based on the magnitude relation between the measured value corresponding to a row region whose density for which the correction values are to be set is 50% density and the target density Cbt. Here, the group of the measured values to be referred to is specified such that the target density falls under a scope between the measured value of the to-be-set row region and the measured value at the other density. That is, when the measured value of the to-be-set row region is higher than the target density, a group of the measured value of the to-be-set row region and the measured value of the lower side density is specified as the group of the measured values to be referred to. On the contrary, when the measured value of the to-be-set row region is lower than the target density, a group of the measured value of the to-be-set row region and the measured value of the higher side density is specified as the group of the measured values to be referred to.

For example, in a row region LAn, the measured result of the row region at 30% density is X1, that at 50% density is Y1 and that at 70% density is Z1. Here, the measured result Y1 at 50% density is plotted below the target density Cbt in the graph. The vertical axis of the graph represents lower density on the upper side and higher density on the lower side. Accordingly, the measurement result Y1 of the row region LAn at 50% density is higher than the target density Cbt. For this reason, the host-side controller 210 specifies, as a group of measurement values to be referred to, the measurement value that corresponds to the row region at 50% density and the measurement value that corresponds to the row region at 30% density. Also in a row region LAm, the measured result of the row region at 30% density is X2, that at 50% density is Y2 and that at 70% density is Z2. In this case, the density of the row region LAm at 50% density is lower than the target density Cbt. For this reason, the host-side controller 210 specifies, as a group of measurement values to be referred to, the measurement value that corresponds to the row region at 50% density and the measurement value that corresponds to the row region at 70% density.

After specifying the group of the measurement values to be referred to, the host-side controller 210 sets correction values for the to-be-set row region. Setting of correction values is performed by linear interpolation based on the measured values and the instructed tone values. The host-side controller 210 performs linear interpolation calculation for each row region, so as to set correction values for the instructed tone value Sb (50% density) for each row region.

Correction values are set in a similar procedure for row regions at other densities, that is, the row regions at 30% density and 70% density. It should be noted that at 30% density and 70% density, the density to be referred to is fixed, which is different from the case of 50% density. In other words, in the case of 30% density, the measured value of the row region at 30% density and that at 50% density are referred to. In the case of 70% density, the measured value of the row region at 70% density and that at 50% density are referred to. Then as in the case of 50% density, correction values are set by performing linear interpolation based on the measured values and the instructed tone values.

Setting of Attenuation Area Correction Values

Next, setting of attenuation area correction values is described. The attenuation area correction value is applied to the one-pass and two-pass coexistent area in the normal process area, and corresponds to another correction value. As shown in FIG. 20, the one-pass printing area of the normal process area is adjacent to the one-pass and two-pass coexistent area on the downstream side in the transport direction therefrom, and the two-pass printing area of the normal process area is adjacent to the one-pass and two-pass coexistent area on the upstream side in the transport direction therefrom.

The one-pass and two-pass coexistent area is constituted by a 63rd row region to a 74th row region. Here, the row regions in which raster lines are formed by the two-pass printing are 63rd, 66th, 69th, 70th, 72nd, and 73rd row regions. Raster lines in the other row regions are formed by the one-pass printing. When the row regions in which raster lines are formed by the two-pass printing are focused, these row regions appear once in three row regions in a former half of the one-pass and two-pass coexistent area. On the other hand, these row regions appear twice in three row regions in a latter half of the one-pass and two-pass coexistent area. In this manner, a ratio at which a raster line (a dot row) is formed by the two-pass printing increases as the distance from the one-pass printing area increases.

In the two-pass printing, two nozzles Nz are used for a certain row region. In other words, dots formed with different nozzles Nz coexist in a single raster line. For example, in the 63rd row region, dots formed by the seventh nozzle Nz (#7) and dots formed by the first nozzle Nz (#1) coexist. Similarly, in the 66th row region, dots formed by the sixth nozzle Nz (#6) and dots formed by the first nozzle Nz (#1) coexist. Then, in the row regions subject to the two-pass printing, the combinations of the nozzles Nz used differ from those used in obtaining the normal area correction values. Therefore, if the normal area correction values are applied as in the one-pass printing area, the correction may have adverse effects. Although it is conceivable not to perform correction in the one-pass and two-pass coexistent area, in such a case, a problem occurs that the image density suddenly changes at the boundary between the one-pass printing area and the one-pass and two-pass coexistent area.

In view of this, in the present embodiment, the attenuation area correction values are applied to the one-pass and two-pass coexistent area. These attenuation area correction values are generated based on the normal process area correction values. That is, the attenuation area correction values are set such that the correction degree based on the normal process area correction values is reduced as the distance from the one-pass printing area increases. More specifically, the attenuation area correction values are set by multiplying the normal process area correction values by the attenuation coefficients, which are larger than 0.00 and less than 1.00, and become smaller as the distance from the one-pass printing area increases. In this example, as shown in FIG. 14, seven types of attenuation area correction values are set, similarly to the normal process area correction values. In other words, a first correction value CV11 of the attenuation area correction values is set by multiplying the first correction value CV1 of the normal process area correction values by a first attenuation coefficient (value: 0.75), and a second correction value CV12 of the attenuation area correction values is set by multiplying the second correction value CV2 of the normal process area correction values by the first attenuation coefficient. A third correction value CV13 of the attenuation area correction values is set by multiplying the third correction value CV3 of the normal process area correction values by a second attenuation coefficient (value: 0.50). Similarly, a fourth correction value CV14 and a fifth correction value CV15 of the attenuation area correction values are respectively set by multiplying the fourth and fifth correction values CV4 and CV5 of the normal process area correction values by the second attenuation coefficient. Furthermore, a sixth correction value CV16 and a seventh correction value CV17 of the attenuation area correction values are respectively set by multiplying the sixth and seventh correction values CV6 and CV7 of the normal process area correction values by a third attenuation coefficient (0.25).

In this manner, in the correction value setting system 20 of the present embodiment, the attenuation area correction values are generated by multiplying the normal process area correction values by the attenuation coefficients. Therefore, the attenuation area correction values can be generated in a simple process. In addition, depending on the method for setting the attenuation coefficients, the correction degree based on the attenuation area correction values can be easily regulated.

Storage of Correction Values

After correction values are set, the host-side controller 210 stores the set correction values in the memory 152 of the printer-side controller 150 (the correction value storage section 155, see FIG. 14) (S255). In this case, the host-side controller 210 communicates with the printer 100, thereby assuring a state in which correction values can be stored. The host-side controller 210 then transfers the correction values stored in the memory 212 thereof so that the correction values are stored in the memory 152 of the printer-side controller 150. In this correction value setting system 20, a total of three types of correction values, namely, correction values for 30% density, 50% density, and 70% density, which are set based on the measured values of the band-like patterns BD(30) to BD(70), are stored. Therefore, these correction values are stored on a row region basis in the correction value storage section 155.

Printing by User

The printer 100, in which the correction values are stored in the correction value storage section 155 through the above-described procedure, is subjected to other inspections and thereafter shipped from the factory. A user who purchases the printer 100 connects the printer 100 to the host computer 200 possessed by the user, as shown in FIG. 1 for example. Once powered on, the printer 100 waits for print data being transmitted from the host computer 200. When print data is transmitted from the host computer 200, the printer 100 performs printing operation. The printing operation performed here is as described above. That is, the host computer 200 refers to the correction values in the color conversion process, and corrects the density (instructed tone value) of the image in the row region according to the corresponding correction value. Then, the host computer 200 performs the halftone process and the like with the corrected image densities and obtains print data. The printer 100 performs printing based on the print data.

As shown in FIGS. 19 and 20, the host computer 200 and the printer 100 do not perform correction based on the correction values in the front end process area. And correction using the normal process area correction values is performed in the front end side coexistent area and the one-pass printing area in the normal process area. In other words, the host computer 200 performs correction in the color conversion process such that with respect to a row region that tends to be recognized dark, the tone value of pixel data (CMYK data) of unit regions corresponding to that row region is reduced. In contrast, the host computer 200 performs correction such that with respect to a row region that tends to be recognized light, the tone value of pixel data of unit regions corresponding to that row region is increased. The print data generated as described above is outputted to the printer 100. The printer 100 then adjusts the ink ejection amount based on the print data. As a result, the density of image pieces corresponding to the respective row regions in the printed image printed by the printer 100 is corrected, and the inconsistent density in the entire image can be suppressed.

Also the host computer 200 and the printer 100 perform correction using the attenuation area correction values in the one-pass and two-pass coexistent area. For example, the 63rd row region is corrected using the first correction value CV11 of the attenuation area correction values, and the 64th row region is corrected using the second correction value CV12 of the attenuation area correction values. Similarly, the 65th to 69th row regions are corrected using the corresponding correction values CV13 to CV17, respectively. As regards the 70th to 74th row regions, correction is not performed since there is no corresponding correction value.

Adopting the above-described correction method enables appropriate correction to be performed on each row region in the one-pass and two-pass coexistent area. On the side close to the one-pass printing area in the one-pass and two-pass coexistent area, a ratio of row regions that is printed by the one-pass printing and for which application of the normal process area correction values is suitable is high. For this reason, by using the correction values CV11 to CV15 that are generated with a comparatively large attenuation coefficient, appropriate correction is possible for the row regions for which application of the normal process area correction values is suitable. In other words, without reducing the correction degree so much, appropriate correction is possible for a certain range of row regions. In the one-pass and two-pass coexistent area, row regions printed by the two-pass printing increases as the distance from the one-pass printing area increases. That is, a ratio of row regions for which application of the normal process area correction values is not suitable increases. For this reason, by using the correction values CV16 and CV17 that are generated with a comparatively small attenuation coefficient, it is possible to reduce the correction degree on the row regions for which application of the normal process area correction values is not suitable, and therefore it is possible to suppress adverse effects due to correction.

In the attenuation area correction values, the correction degree based on the normal process area correction values is reduced as the distance from the one-pass printing area increases. Therefore, the density changes gradually when shifting is made from an area subject to correction to an area not subject to correction. As a result, a problem of the correction value suddenly changing can be prevented, and deterioration of image quality caused by such sudden changing can be prevented. Also in the present embodiment, the normal process area correction values and the attenuation area correction values are stored in the correction value storage section 155. Therefore, the CPU 211 is only required to read out corresponding correction values in the color conversion process. Consequently, the processes can be simplified and performed in a shorter time.

When printing for the one-pass and two-pass coexistent area is finished, printing for the two-pass printing area of the normal process area is performed. This two-pass printing area is provided so as to correspond to the position at which the upstream end of the paper S ceases to be held by the transport rollers 113. In other words, the upstream end of the paper S ceases to be held by the transport rollers 113 during printing for the two-pass printing area. Then, when the upstream end of the paper S ceases to be held by the transport rollers 113, at that moment, paper S is transported comparatively roughly than a normal state. At this time, the printer 100 is performing the two-pass printing for each row region in the two-pass printing area. Therefore, even if the paper S is transported comparatively roughly than a normal state at the moment the upstream end of the paper S ceases to be held by the transport rollers 113, it is possible to make inconsistent density less noticeable.

When printing for the two-pass printing area is finished, printing for the rear end side coexistent area and the rear end process area is performed. In the rear end side coexistent area, dots formed by the normal process and dots formed by the rear end process coexist in a certain row region. In the rear end process area, raster lines are formed by the rear end process only.

General Overview

As described above, in the printing system 10 of the first embodiment, the attenuation area correction values are used for the one-pass and two-pass coexistent area in the normal printing area. The attenuation area correction values are obtained by changing the correction degree based on the normal area correction values using the attenuation coefficients. That is, the attenuation area correction values are set such that the correction degree is reduced as the distance from the one-pass printing area increases. In this manner, even when the number of passes required to form a certain dot row is changed, deterioration of image quality due to such a change can be prevented.

In addition, row regions subject to the two-pass printing are arranged only on the upstream side of the paper S, and other row regions are formed by the one-pass printing. Therefore, the number of row regions subject to the two-pass printing is limited to a minimum, and the speed of printing process can be thereby increased.

Furthermore, in this printer 100, the head 131 includes nozzle rows, each of which is made up of a plurality of nozzles Nz lined up in the transport direction. The normal area correction values and the attenuation area correction values are respectively set for plural types so as to correspond to combinations of row regions and the nozzles Nz. Therefore, it is possible to prevent deterioration of the image quality caused by the characteristics variance of nozzles, and an ink ejection amount can be adjusted efficiently even with a small number of types of correction values.

The head 131 includes a plurality of types of the nozzle rows Nk to Nlm that correspond to the types of ink to be ejected, which enables multi-color printing of high image quality.

Second Embodiment

The above-described printer 100 of the first embodiment is configured such that the two-pass printing is performed while the rear end of the paper S is not held by the transport rollers 113. In relation to this, in the area in which the one-pass printing is switched to the two-pass printing (the one-pass and two-pass coexistent area), the ink ejection amount is adjusted based on the attenuation area correction values. In the printer 100 that is performing the two-pass printing when the front end of the paper S is sandwiched between the discharge rollers 114, a similar control to the first embodiment may be performed when the two-pass printing is switched to the one-pass printing at the front end portion of the paper S. A second embodiment configured in such a manner is described below. The configurations of the printing system 10 and the correction value setting system 20 of the second embodiment are basically the same as those described in the first embodiment. Therefore, the same reference numerals are assigned to the same components, and description thereof is omitted.

Increase Area Correction Values

Figure 21:
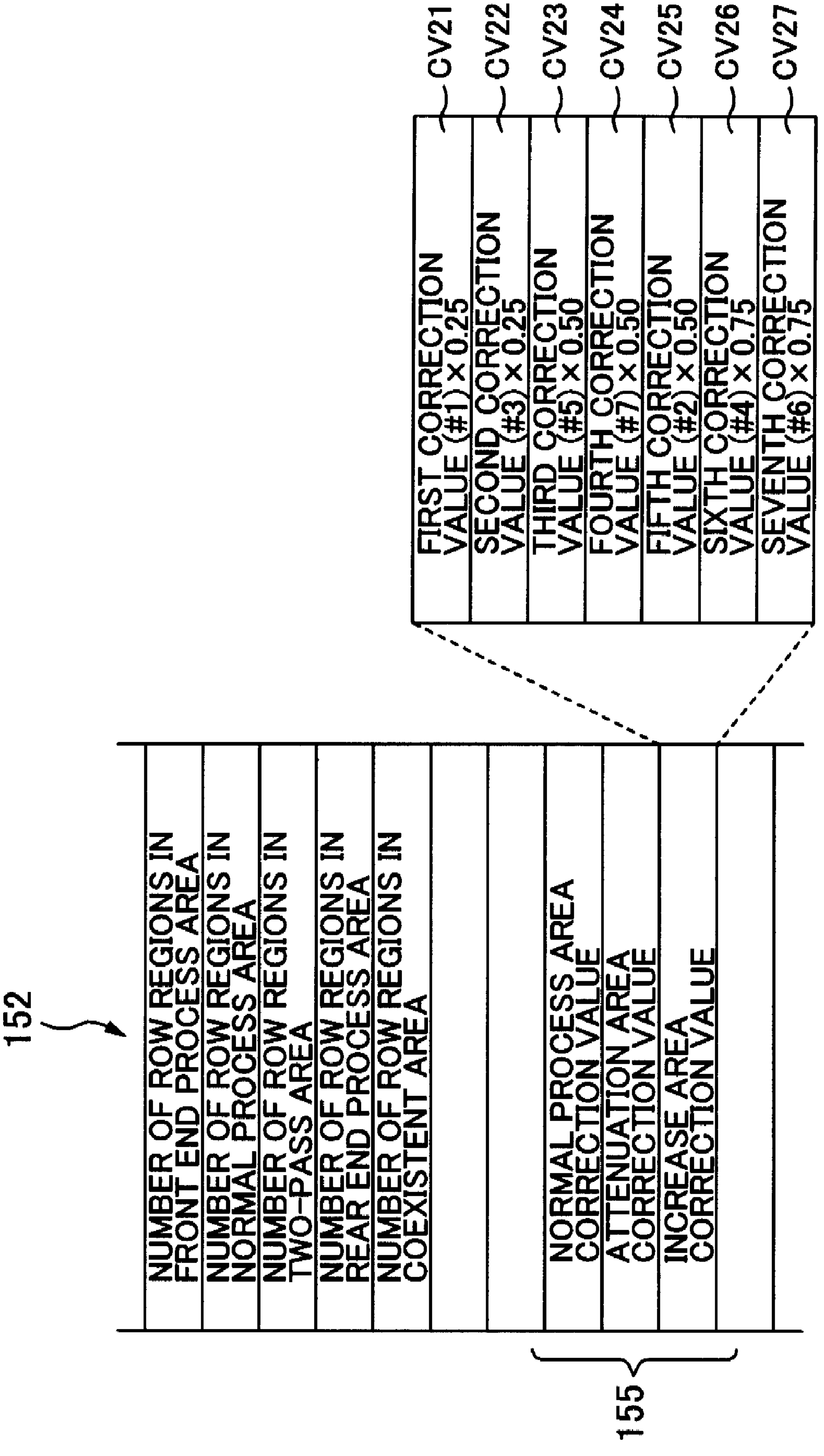
FIG. 21 is a conceptual diagram for illustrating a correction value storage section of a second embodiment.
Figure 22:
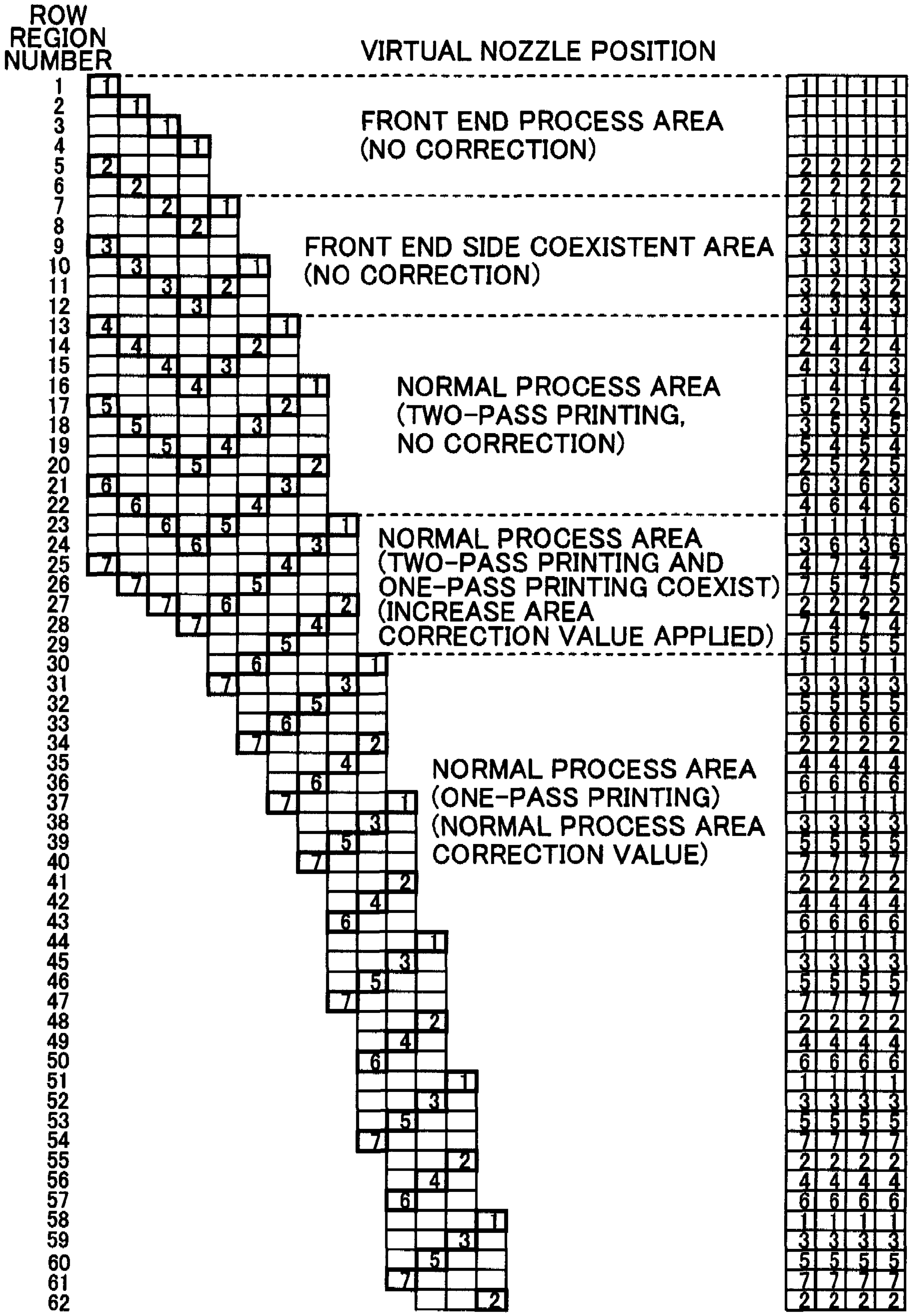
FIG. 22 is a diagram illustrating setting of correction values from a front end process area to a normal process area according to the second embodiment.

As shown in FIG. 21, the printer 100 of the second embodiment is provided with an area for storing increase area correction values in the correction value storage section 155. Here, the increase area correction values are applied to the two-pass and one-pass coexistent area (corresponding to another area) provided between the two-pass printing area and the one-pass printing area in the front end side of the paper S, as shown in FIG. 22, and correspond to another correction values. The increase area correction values are set based on the normal process area correction values, which are obtained by increasing the correction degree based on the normal process area correction values as the distance from the one-pass printing area decreases. In the second embodiment as well, attenuation coefficients are used to generate the increase area correction values, as in the first embodiment. Specifically, a first correction value CV21 of the increase area correction values is set by multiplying the first correction value CV1 of the normal process area correction values by the third attenuation coefficient (value: 0.25), and a second correction value CV22 of the increase area correction values is set by multiplying the second correction value CV2 of the normal process area correction values by the third attenuation coefficient. A third correction value CV13 of the increase area correction values is set by multiplying the third correction value CV3 of the normal process area correction values by the second attenuation coefficient (value: 0.50). Similarly, a fourth correction value CV24 and a fifth correction value CV25 of the increase area correction values are respectively set by multiplying the fourth and fifth correction values CV4 and CV5 of the normal process area correction values by the second attenuation coefficient. Furthermore, a sixth correction value CV26 and a seventh correction value CV27 of the increase area correction values are respectively set by multiplying the sixth and seventh correction values CV6 and CV7 of the normal process area correction values by the first attenuation coefficient (0.75). In this manner, also in the correction value setting system 20 of the present embodiment, the increase area correction values are generated by multiplying the normal process area correction values by the attenuation coefficients. Therefore, the attenuation area correction values can be generated in a simple process. In addition, depending on the method for setting the attenuation coefficients, the correction degree based on the attenuation area correction values can be easily set.

Regarding Areas

In the second embodiment, the one-pass printing area corresponds to a certain area that includes a plurality of first type row regions in which a dot row is formed along the movement direction by a predetermined times of the movement-and-ejection operation, adjacent to one another in the transport direction. Also, the two-pass and one-pass coexistent area corresponds to another area. That is, the two-pass and one-pass coexistent area corresponds to another area that is provided on the downstream side in the transport direction from the certain area, and includes in the transport direction a plurality of the above-described first type row regions and a plurality of second type row regions in which a dot row is formed along the movement direction by the movement-and-ejection operation of another predetermined times that is more than the above predetermined times, with a ratio of the second type row region decreasing as the distance to the certain area decreases. Then, the front end of the paper S reaches the discharge rollers 114 during printing for the two-pass printing area. Therefore, the two-pass printing area corresponds to a downstream side area that is provided on the downstream side in the transport direction from the other area and that includes a plurality of the second type row regions adjacent to one another in the transport direction.

It should be noted that procedures for setting various correction values and storing the correction values in the correction value storage section 155 of the second embodiment are similar to those of the first embodiment, and description thereof is omitted.

Printing by User

A user who purchases the printer 100 storing the correction values in the correction value storage section 155 through the above-described procedure connects the printer 100 to the host computer 200 possessed by the user and performs printing. Operations of the printer 100 and the host computer 200 in this case are similar to those in the first embodiment. That is, the host computer 200 refers to the correction values in the color conversion process, and corrects the density (instructed tone value) of the image in the row region in accordance with the corresponding correction value. The printer 100 performs printing based on the corrected print data.

In the second embodiment, as shown in FIG. 22, the host computer 200 and the printer 100 do not perform correction using the correction values in the front end process area, the front end side coexistent area, and the two-pass printing area of the normal process area. Then, while printing for the two-pass printing area is performed, the front end (the downstream end) of the paper S reaches the discharge rollers 114. A different force is applied to the paper S as a result of the paper S being sandwiched by the discharge rollers 114. In relation to this, it is conceivable that the transport state of the paper S changes. However, since the two-pass printing is performed on the paper S at this moment, it is possible to make inconsistent density less noticeable.

Correction using the attenuation area correction values is performed in the two-pass and one-pass coexistent area. For example, a 23rd row region is corrected using the first correction value CV21 of the increase area correction values, and a 24th row region is corrected using the second correction value CV22 of the increase area correction values. Similarly, 25th to 29th row regions are corrected using the corresponding correction values CV23 to CV27, respectively.

Adopting the above-described correction method enables appropriate correction to be performed on each row region in the two-pass and one-pass coexistent area. Specifically, on the side distant from the one-pass printing area of the two-pass and one-pass coexistent area, the ratio of the row regions for which application of the normal process area correction values is not suitable is comparatively high. On the contrary, on the side close to the one-pass printing area thereof, the ratio of the row regions for which application of the normal process area correction values is suitable is comparatively high. It should be noted that in the example of FIG. 22, since the number of nozzles Nz is limited to seven for the purpose of description, it is not easy to find the regularity. However, since the regularity shows a relationship opposite to that in the above-described first embodiment, it is conceivable that the ratio of the row regions for which application of the normal process area correction values is suitable comparatively increases as the distance to the one-pass printing area decreases. As a result, deterioration of image quality can be prevented when shifting is made from the two-pass printing area to the one-pass printing area. That is, since the correction degree based on the correction values is gradually increased, the effects of the correction become evident in a gradual manner as the distance to the one-pass printing area decreases. As a result, rapid change in density is suppressed, which makes it possible to make the density change due to change in the correction degree less noticeable.

When printing for the two-pass and one-pass coexistent area is finished, printing for the one-pass printing area is performed. In this case, since correction is made based on the normal process area correction values, printing of high image quality is possible. Processes performed thereafter are the same as those in the first embodiment, and therefore description thereof is omitted.

General Overview

As described above, in the printing system 10 of the second embodiment, the increase area correction values are used for the two-pass and one-pass coexistent area in the normal printing area. The increase area correction values are obtained by changing the correction degree based on the normal area correction values in accordance with the attenuation coefficients. That is, the increase area correction values are set such that the correction degree is increased as the distance to the one-pass printing area decreases. In this manner, even when the number of passes required to form a certain dot row is changed, deterioration of image quality due to such a change can be prevented. Also the printer 100 basically performs the one-pass printing, and performs the two-pass printing when the front end of the paper S reaches the discharge rollers 114 or when the rear end of the paper S ceases to be held by the transport rollers 113. Therefore, the number of row regions subject to the two-pass printing is limited to a minimum, and the speed of printing process can be thereby increased.

Other Embodiments

In the foregoing embodiments, the correction value setting system 20 having the printer 100 is mainly described. However, the foregoing description also includes the disclosure of a method for setting correction values and a correction value setting apparatus. Moreover, the foregoing embodiments are for the purpose of elucidating the invention, and are not to be interpreted as limiting the invention. The invention can of course be altered and improved without departing from the gist thereof, and includes functional equivalents. In particular, embodiments described below are also included in the invention.

Regarding Printing Mode

In the foregoing embodiments, a case is described in which the row regions are made up of row regions printed by the one-pass printing and those by the two-pass printing. However, the number of passes required for the row region is not limited to these. For example, the row regions may be made up of row regions printed by two-pass printing and those by four-pass printing. Other number of passes may be employed as well.

Regarding Attenuation Coefficient

In the foregoing embodiments, a configuration is described in which the process host computer 200' performs calculations based on the normal area correction values and attenuation coefficients so as to set the attenuation area correction values or the increase area correction values. In relation to this, the memory 152 (for example, the correction value storage section 155) of the printer 100 may store the attenuation coefficients. In such a configuration, the printer driver 216 refers to the normal area correction values and the attenuation coefficients to perform correction. With such a configuration as well, the same effects as the foregoing embodiments can be achieved.

Regarding Printing System 10

In the foregoing embodiments, in relation to the printing system 10, a configuration is described in which the printer 100 as the printing apparatus and a computer as the print control apparatus are provided as separate components. However, there is no limitation to this. The printing apparatus and the print control apparatus may be integrated to constitute the printing system 10. Alternatively, the printing system 10 may be a printer-scanner multifunctional peripheral with the scanner 300 integrated thereto. With such a multifunctional peripheral, it is easy for a user to set the correction values again. That is, the correction value setting system 20 can be constructed simply.

Regarding Resetting Correction Values

In the above, setting of the correction values in the processes is described. That is, setting of the correction values at the time of manufacturing is described. In relation to this, the correction values may be reset after shipment.

Regarding Ink

In the foregoing embodiments, six colors of ink are ejected from the head 131. However, the types of ejected ink are not limited to these six colors. Different colors may be chosen, or a larger number of colors may be used. For example, red ink, violet ink or gray ink may be included.

Regarding Other Exemplary Applications

Moreover, although the printer 100 is described in the foregoing embodiment, the invention is not limited to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly polymer EL manufacturing devices), display manufacturing devices, film formation devices, and DNA chip manufacturing devices. Moreover, methods and manufacturing methods of these are also within the scope of application.

What is claimed is:

1. A printing method comprising:

(A) performing correction of an ink ejection amount for a certain area based on a correction value for a first type row region, the certain area including a plurality of the first type row regions adjacent to each other in a transport direction of a medium, the first type row region being a region in which a dot row is formed in a movement direction that intersects the transport direction by performing a predetermined number of times a movement-and-ejection operation in which ink is ejected from a nozzle while the nozzle is moved in the movement direction; and (B) performing correction of an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

2. A printing method according to claim 1, wherein the other correction value is generated based on the correction value for the first type row region and an attenuation coefficient to reduce a degree of the correction.

3. A printing method according to claim 1, wherein the dot row is formed in the first type row region by performing the movement-and-ejection operation once, and the dot row is formed in the second type row region by performing the movement-and-ejection operation twice.

4. A printing method according to claim 1, wherein the nozzles are lined up in the transport direction and form a nozzle row.

5. A printing method according to claim 4, wherein a plurality of the nozzle rows are provided in different positions in the movement direction.

6. A printing method according to claim 5, wherein the nozzle rows respectively eject different colors of ink.

7. A printing method according to claim 4, wherein the correction value for the first type row region is set for plural types so as to correspond to combinations of the row region and the nozzle used to form a dot row in the row region.

8. A printing apparatus, comprising:

(A) a nozzle movement mechanism that moves a nozzle that ejects ink in a movement direction;

(B) a transport mechanism that transports a medium in a transport direction that intersects the movement direction; and (C) a controller that controls a movement-and-ejection operation for ejecting ink while moving the nozzle and a transport operation for transporting the medium in the transport direction, corrects an ink ejection amount for a certain area based on a correction value for a first type row region, the certain area including a plurality of the first type row regions adjacent to each other in the transport direction, the first type row region being a region in which a dot row is formed in the movement direction by performing a predetermined number of times the movement-and-ejection operation, and corrects an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

9. A printing apparatus according to claim 8, further comprising, a memory in which the correction value for the first type row region and the other correction value are stored.

10. A printing apparatus according to claim 8, wherein the transport mechanism includes a transport roller that transports the medium, the transport roller being disposed on the upstream side in the transport direction from a plurality of nozzles, and transporting the medium until printing for the other area is finished.

11. A storage medium having a program stored thereon, the program comprising:

(A) code that causes a controller to control a movement-and-ejection operation and a transport operation, the movement-and-ejection operation being for ejecting ink while moving a nozzle in a movement direction, the transport operation being for transporting a medium in a transport direction that intersects the movement direction;

(B) code that causes the controller to correct an ink ejection amount for a certain area based on a correction value for a first type row region, the certain area including a plurality of the first type row regions adjacent to each other in the transport direction, the first type row region being a region in which a dot row is formed in the movement direction by performing a predetermined number of times the movement-and-ejection operation; and (C) code that causes the controller to correct an ink ejection amount for another area located on the upstream side in the transport direction from the certain area, based on another correction value obtained by reducing a degree of the correction based on the correction value for the first type row region as a distance from the certain area increases, the other area including a plurality of second type row regions and a plurality of the first type row regions in the transport direction, the second type row region being a region in which a dot row is formed in the movement direction by performing the movement-and-ejection operation another predetermined number of times that is more than the predetermined number of times, a ratio of the second type row regions increasing as the distance from the certain area increases.

* * * * *